United States Patent
Kim et al.

(10) Patent No.: US 12,041,630 B2
(45) Date of Patent: Jul. 16, 2024

(54) METHOD FOR DETERMINING TRANSMISSION BLOCK SIZE AND TRANSMITTING AND RECEIVING DATA IN WIRELESS COMMUNICATION SYSTEM, AND DEVICE FOR SAME

(71) Applicant: LG Electronics Inc., Seoul (KR)

(72) Inventors: Kyuseok Kim, Seoul (KR); Hyungtae Kim, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 17/598,361

(22) PCT Filed: Feb. 14, 2020

(86) PCT No.: PCT/KR2020/002094
§ 371 (c)(1),
(2) Date: Sep. 27, 2021

(87) PCT Pub. No.: WO2020/204347
PCT Pub. Date: Oct. 8, 2020

(65) Prior Publication Data
US 2022/0159703 A1 May 19, 2022

(30) Foreign Application Priority Data

Mar. 29, 2019 (KR) .......... 10-2019-0037390
Mar. 29, 2019 (KR) .......... 10-2019-0037391
(Continued)

(51) Int. Cl.
*H04W 72/12* (2023.01)
*H04W 72/1273* (2023.01)
(Continued)

(52) U.S. Cl.
CPC ....... *H04W 72/23* (2023.01); *H04W 72/1273* (2013.01); *H04W 72/044* (2013.01)

(58) Field of Classification Search
CPC ... H04W 28/04; H04W 72/04; H04W 72/042; H04W 88/08; H04W 72/23; H04W 72/1273; H04W 72/044; H04L 5/0007
(Continued)

(56) References Cited

U.S. PATENT DOCUMENTS

2020/0221428 A1\* 7/2020 Moon ............... H04W 72/23

FOREIGN PATENT DOCUMENTS

CN 108199819 6/2018
CN 108199819 A \* 6/2018 ........... H04W 72/23
(Continued)

OTHER PUBLICATIONS

3GPP TSG RAN WG1 #96, Athens, Greece, Feb. 25-Mar. 1, 2019, R1-1901634, Source: ZTE, Title: Enhancements on multi-TRP/Panel transmission, Agenda item: 7.2.8.2. (Year: 2019).\*
(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

Disclosed are a method for transmitting and receiving data in a wireless communication system, and a device for same. Specifically, a method for a user equipment (UE) to receive a physical downlink shared channel (PDSCH) in a wireless communication system includes: receiving configuration information related to the PDSCH; receiving downlink control information (DCI) for scheduling the PDSCH; receiving a first PDSCH and a second PDSCH on the basis of the configuration information and the DCI, wherein the
(Continued)

DCI includes first transmission configuration indication (TCI)-related information and second TCI-related information.

13 Claims, 19 Drawing Sheets

(30) Foreign Application Priority Data

Aug. 15, 2019 (KR) .................. 10-2019-0100022
Aug. 15, 2019 (KR) .................. 10-2019-0100023

(51) Int. Cl.
*H04W 72/23* (2023.01)
*H04W 72/044* (2023.01)

(58) Field of Classification Search
USPC ..................................................... 370/329
See application file for complete search history.

(56) References Cited

FOREIGN PATENT DOCUMENTS

| CN | 3 800 955 A1 | * | 8/2019 | ............ H04W 72/04 |
|----|----|----|----|----|
| EP | 3445116 | | 2/2019 | |
| KR | 10-2019-0017675 | | 2/2019 | |
| WO | WO 2019/031850 A1 | * | 2/2019 | ............ H04W 72/23 |
| WO | WO 2019031850 | | 2/2019 | |
| WO | WO 2019/049096 | | 3/2019 | |

OTHER PUBLICATIONS

3GPP TSG-RAN WG1 Meeting #96, Feb. 25-Mar. 1, 2019, Athens, Greece, R1-1903043, Agenda item: 7.2.8.2, Source: Qualcomm Incorporated, Title: Multi-TRP Enhancements. (Year: 2019).*
Huawei, HiSilicon, "Enhancements on Multi-TRP/panel transmission," R1-1901567, Presented at 3GPP TSG RAN WG1 Meeting #96, Athens, Greece, Feb. 25-Mar. 1, 2019, 14 pages.
LG Electronics, "Enhancements on multi-TRP/panel transmission," R1-1902091, Presented at 3GPP TSG RAN WG1 #96, Athens, Greece, Feb. 25-Mar. 1, 2019, 11 pages.
Qualcomm Incorporated, "Multi-TRP Enhancements," R1-1903043, Presented at 3GPP TSG-RAN WG1 Meeting #96, Athens, Greece, Feb. 25-Mar. 1, 2019, 30 pages.
ZTE, "Enhancements on multi-TRP/Panel transmission," R1-1901634, Presented at 3GPP TSG RAN WG1 #96, Athens, Greece, Feb. 25-Mar. 1, 2019, 19 pages.
Extended European Search Report in European Application No. 20782112.5, dated Mar. 30, 2022, 10 pages.
Nokia et al., "Summary of Friday offline discussion on potential enhancements for PUSCH for NR URLIC (AI 7.2.6.1.3)," 3GPP TSG-RAN WGl Meeting #96, R1-1903797, Athens, Greece, Feb. 25-Mar. 1, 2019, 39 pages.
Office Action in Chinese Appln. No. 202080025711.8, mailed on Apr. 29, 2023, 20 pages (with English translation).
Office Action in Japanese Appln. No. 2021-557869, mailed on Apr. 4, 2023, 5 pages (with English translation).
Office Action in Japanese Appln. No. 2021-557869, mailed on Nov. 29, 2022, 5 pages (with English translation).
OPPO, "Enhancements on multi-TRP and multi-panel transmission," R1-1902701, 3GPP TSG RAN WG1 Meeting #96, Athens, Greece, Feb. 25-Mar. 1, 2019, 8 pages.
NTT DOCOMO, Inc, "Enhancements on multi-TRP/panel transmission," 3GPP TSG RAN WG1 #96, R1-1902812, Athens, Greece, Feb. 25-Mar. 1, 2019, 25 pages.
Office Action in Korean Appln. No. 10-2021-7031007, mailed on Jan. 30, 2024, 12 pages (with English translation).
Qualcomm Incorporated, "Multi-TRP Enhancements," 3GPP TSG-RAN WG1 Meeting AH-1901, R1-1900905, Jan. 21-25, 2019, Taipei, Taiwan, 26 pages.

* cited by examiner

[FIG. 1]
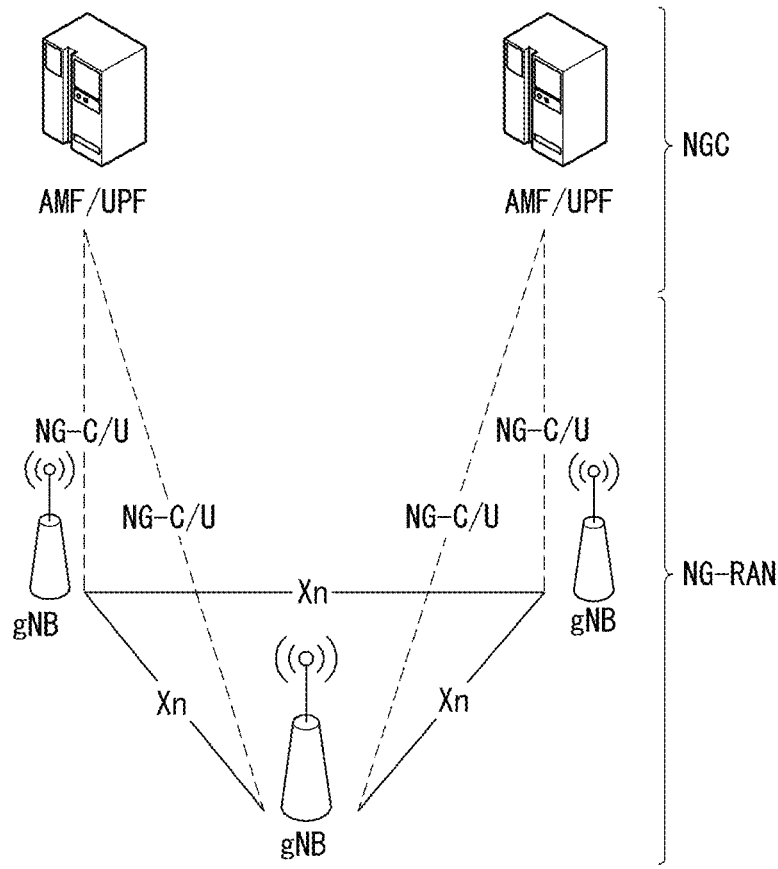
[FIG. 2]
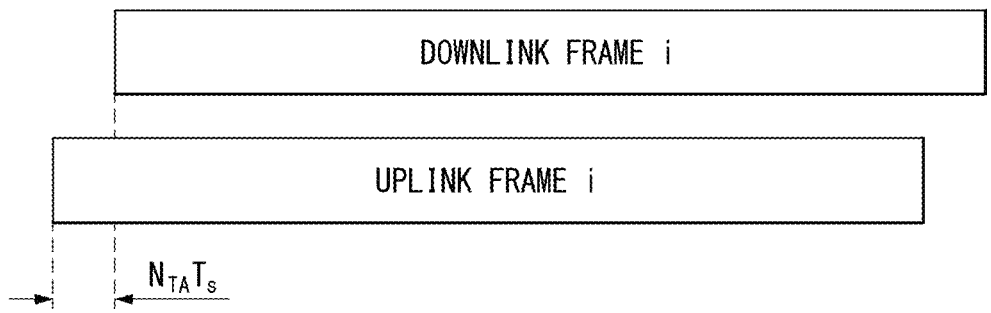

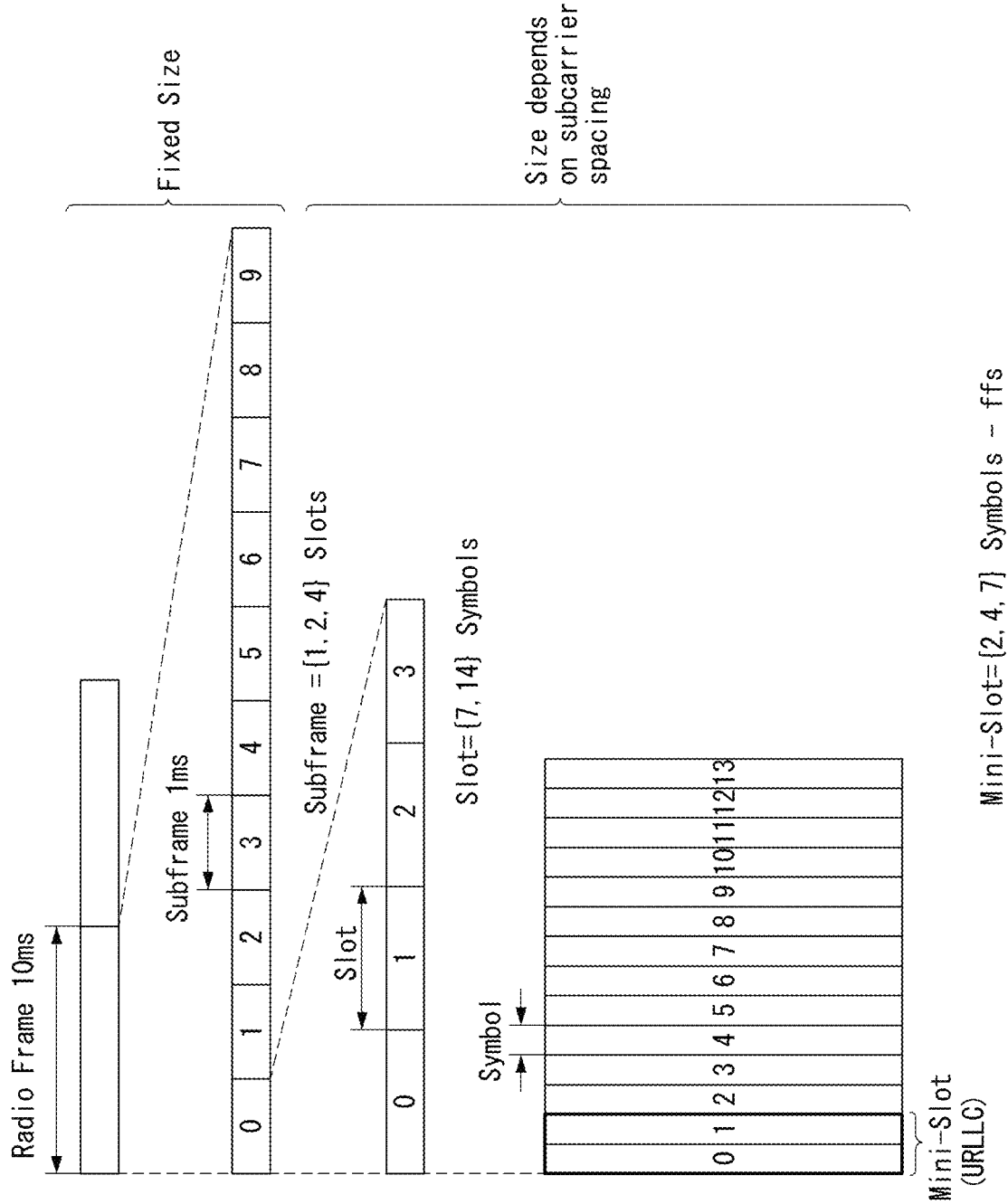

[FIG. 4]
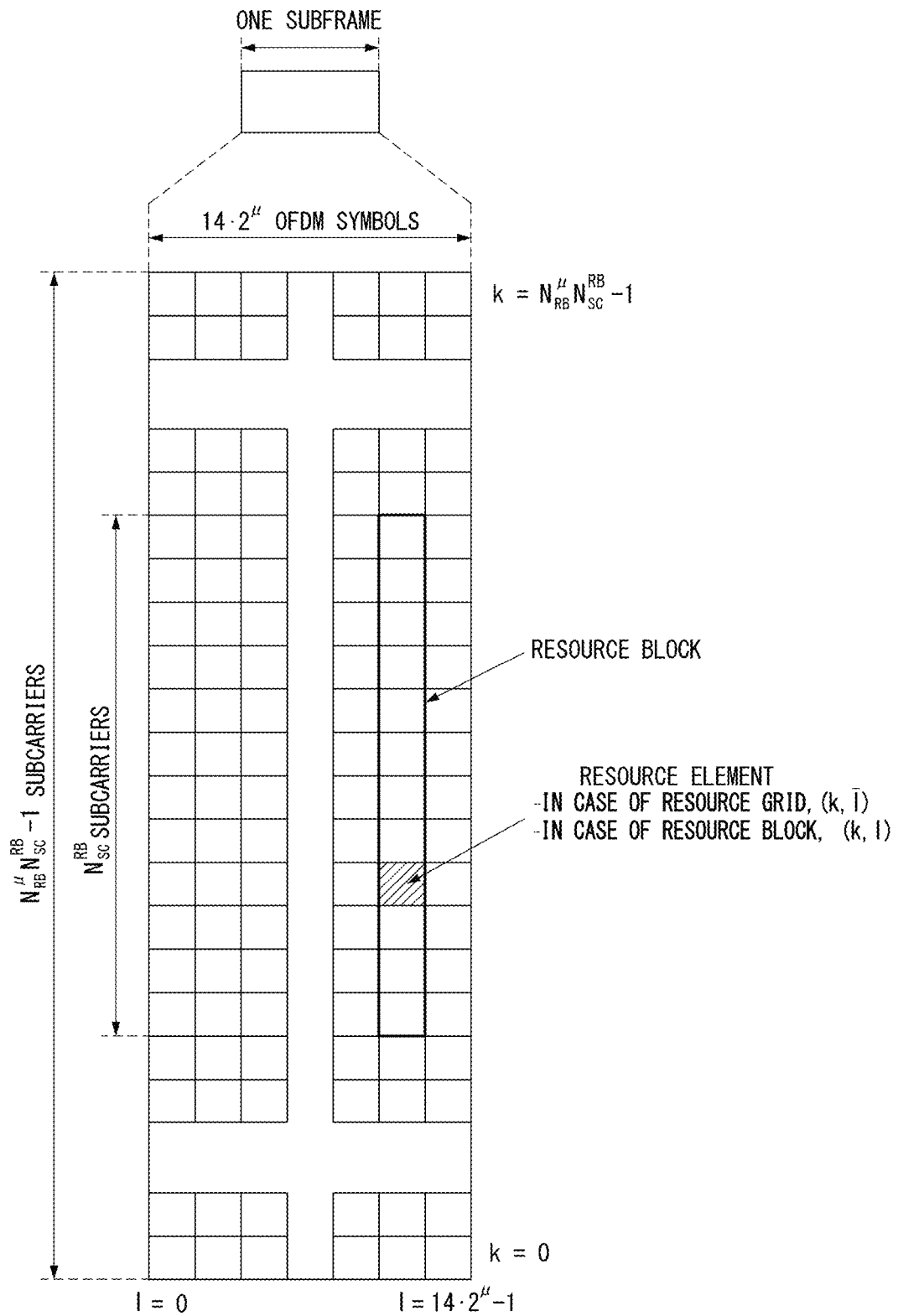

[FIG. 5]
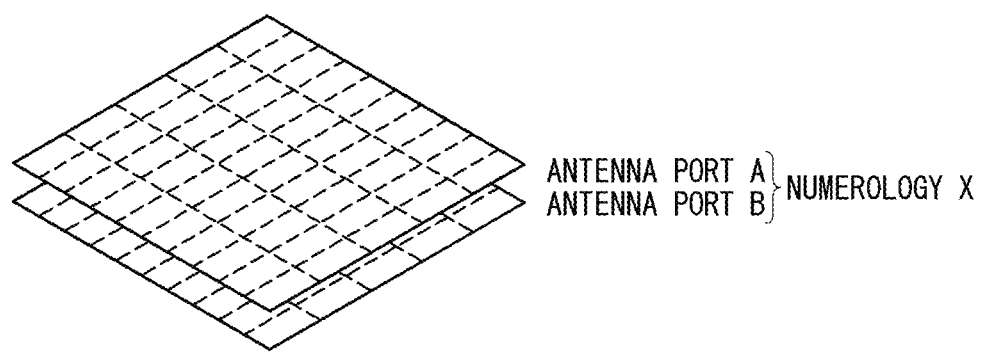
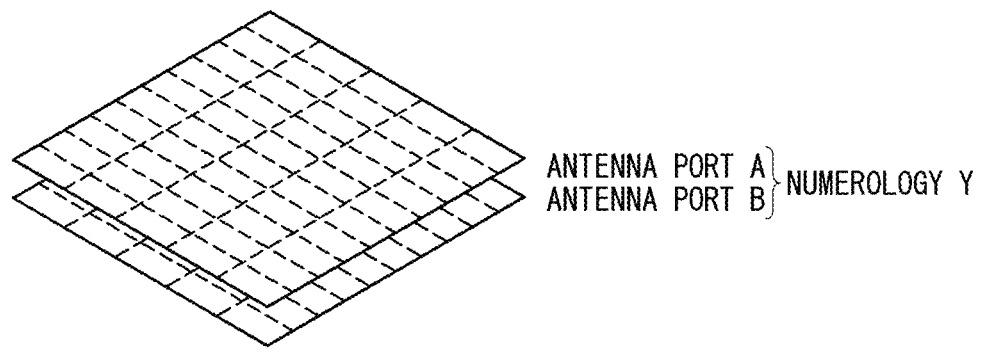

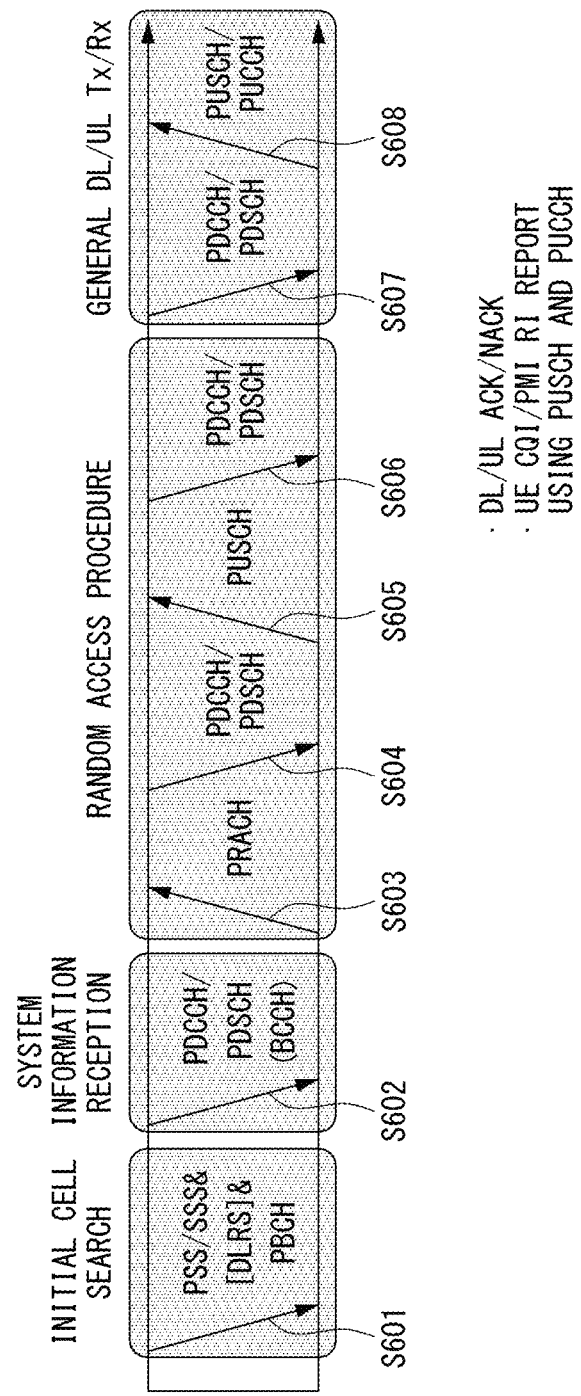
[FIG. 6]

[FIG. 7]
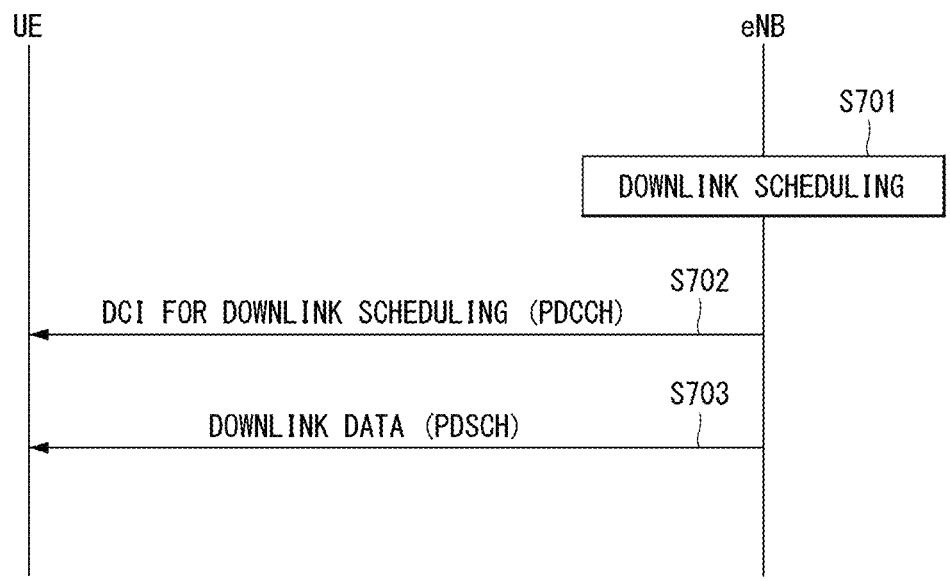
[FIG. 8]
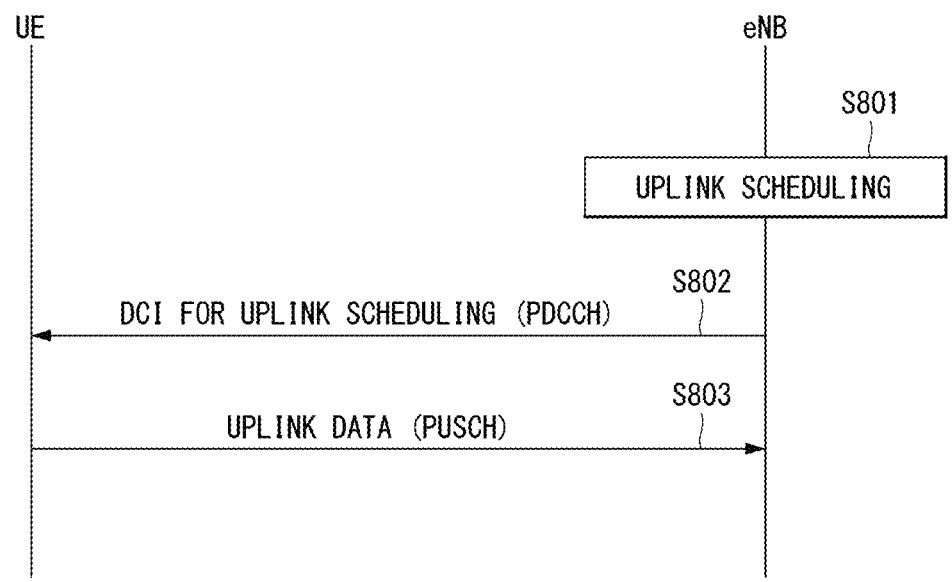

[FIG. 9]
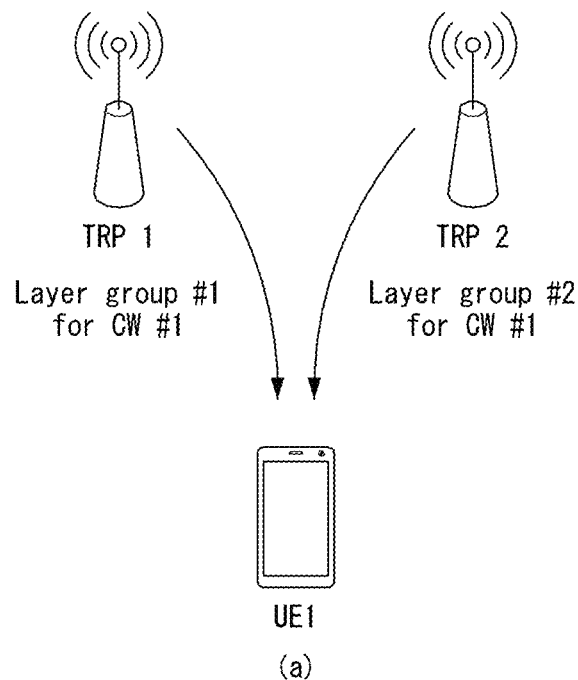
(a)
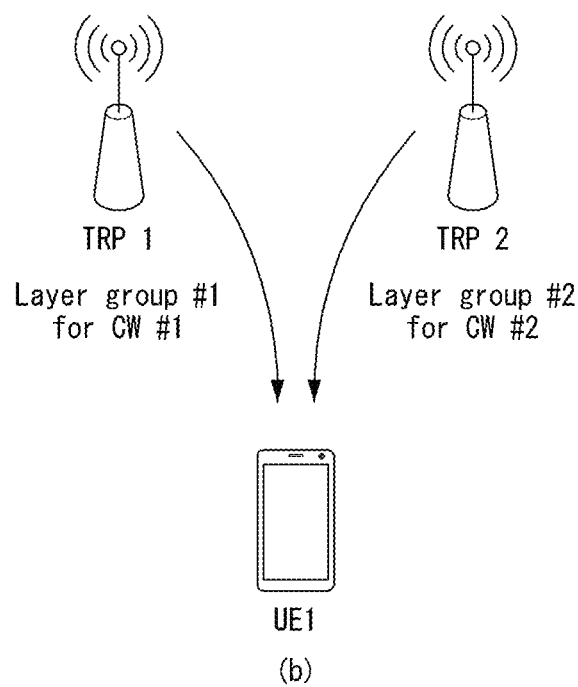
(b)

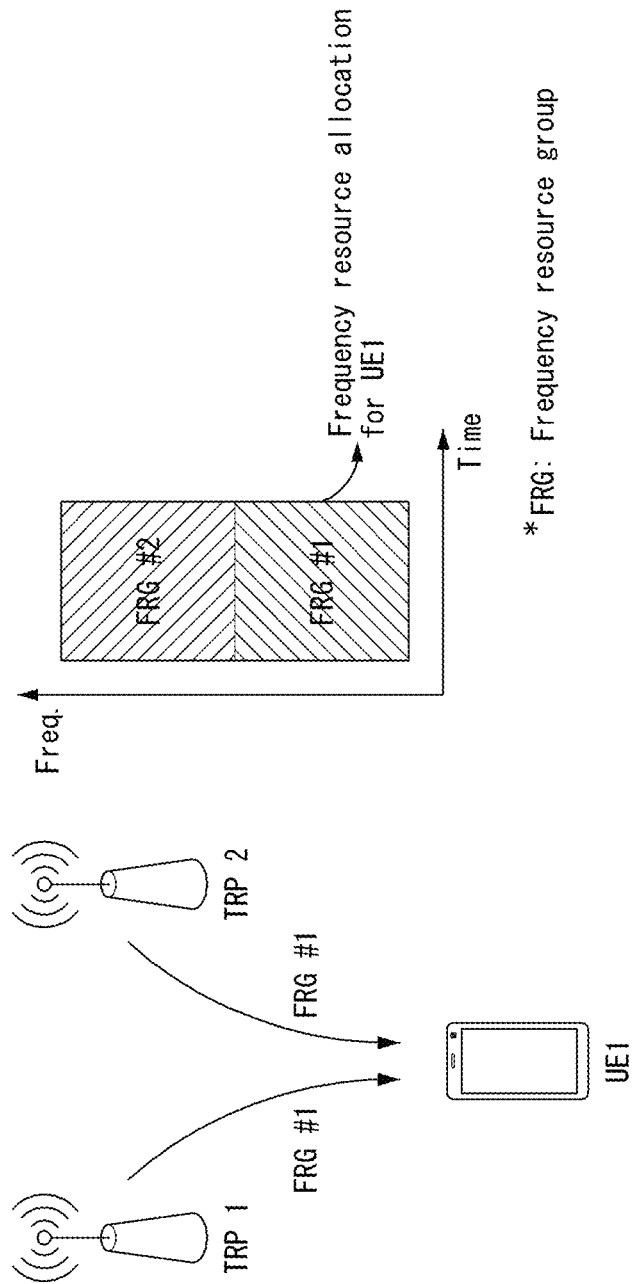

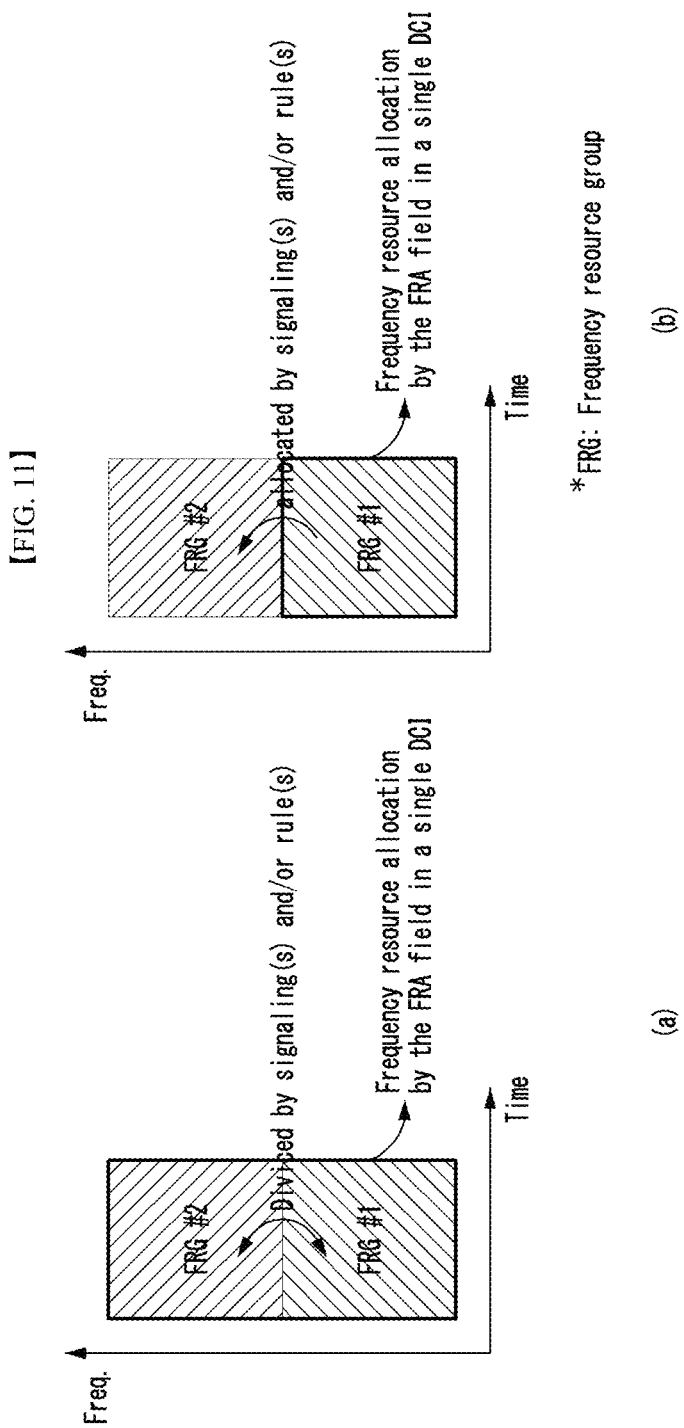

[FIG. 12]
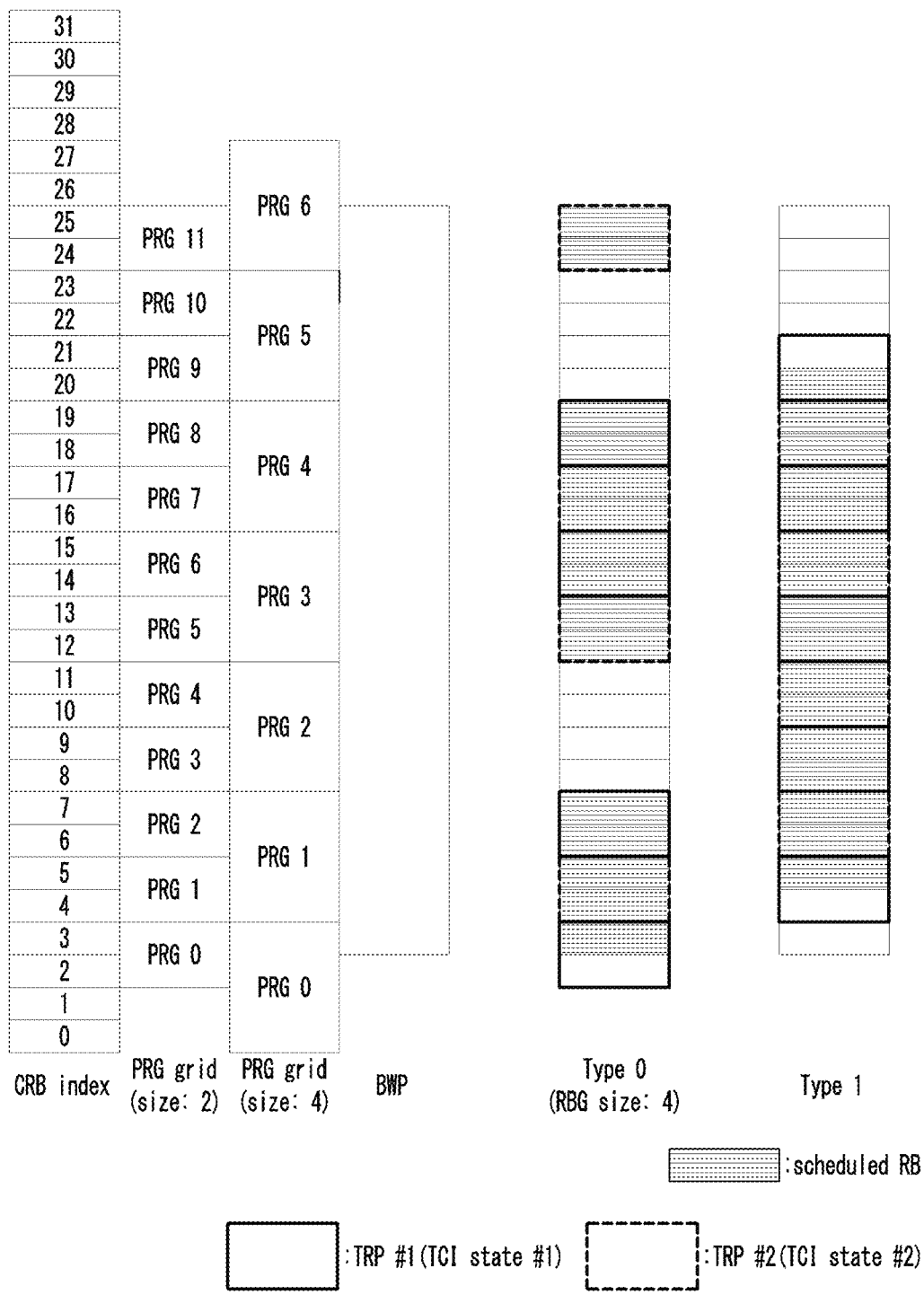

[FIG. 13]
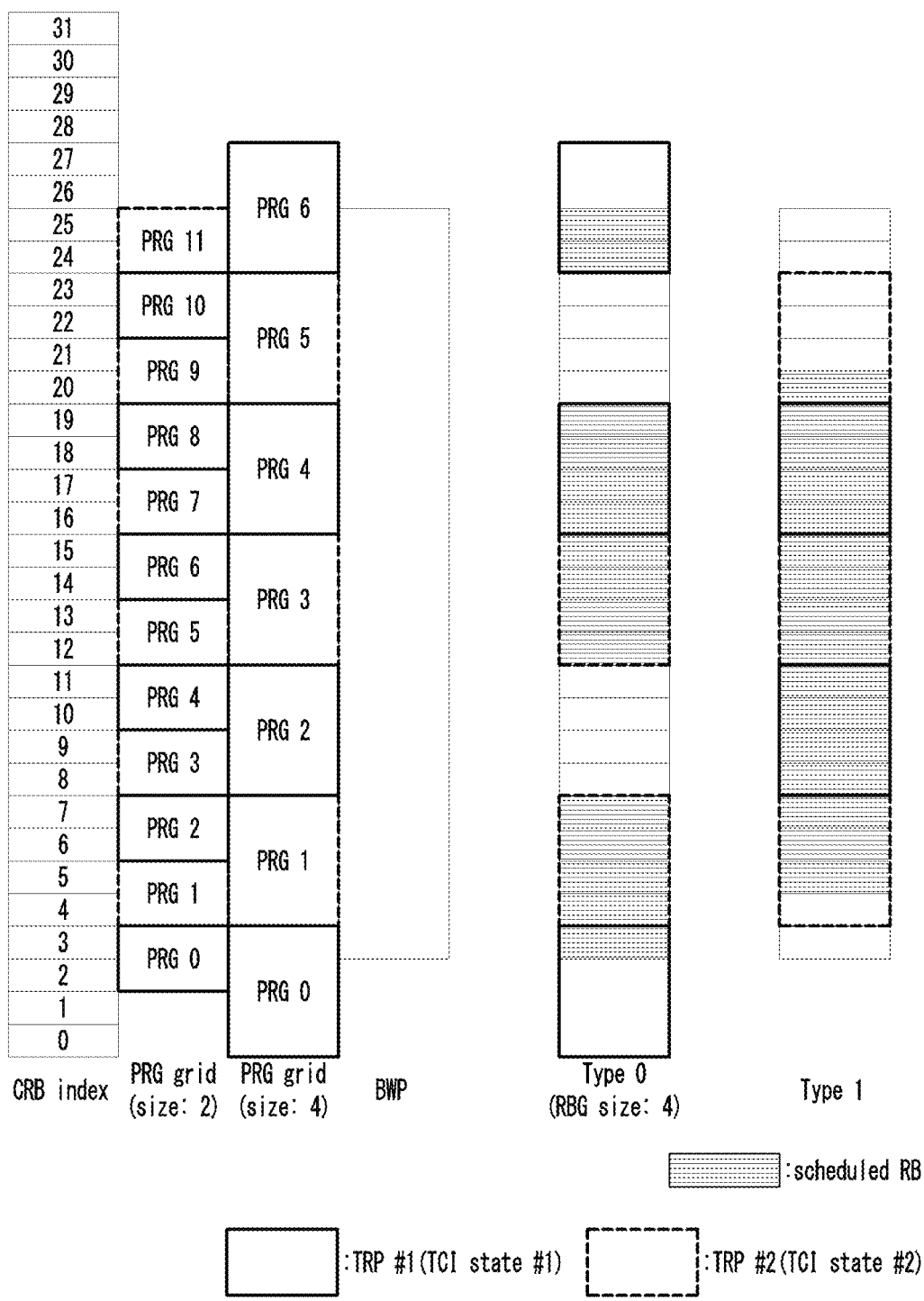

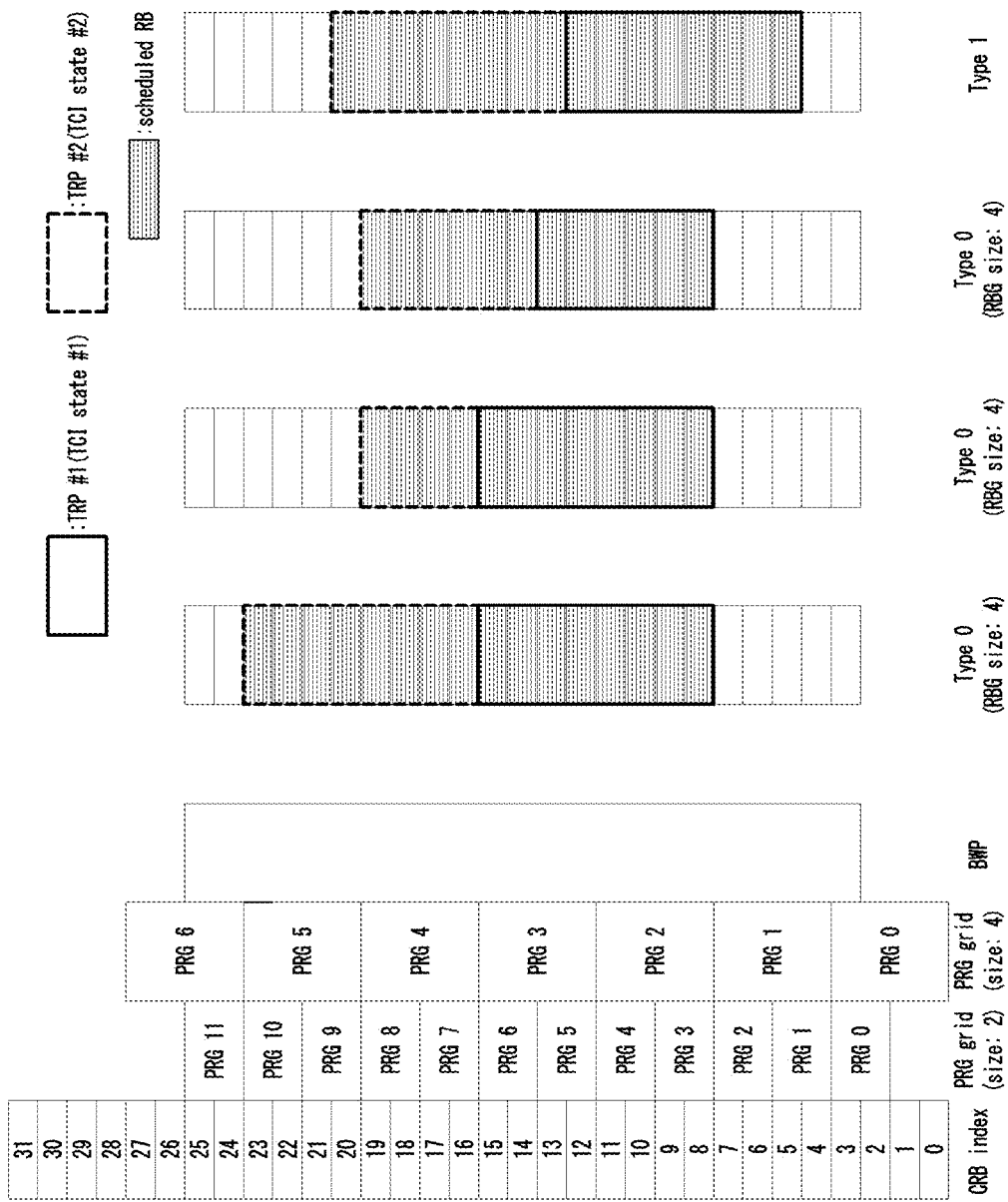

[FIG. 15]
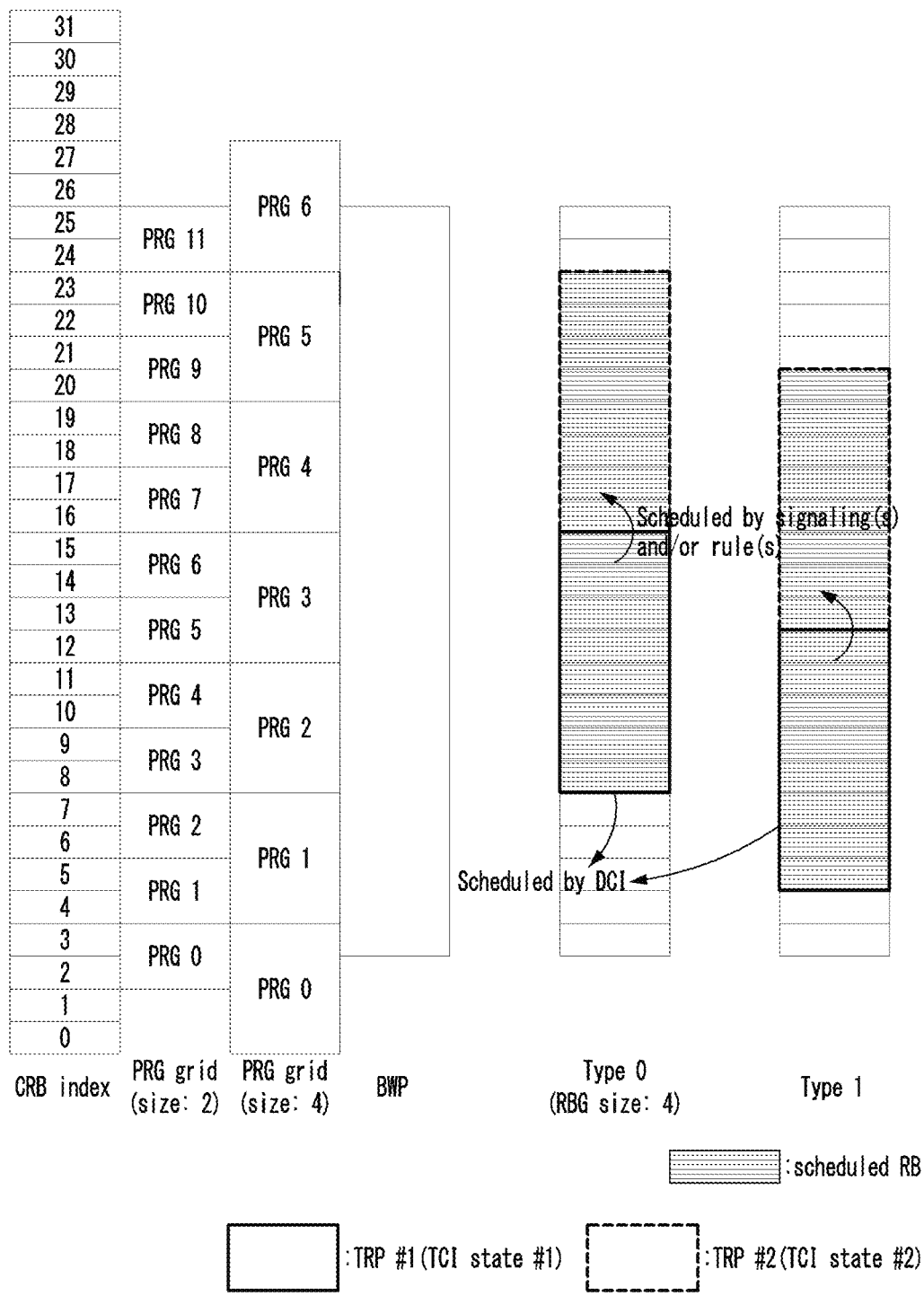

[FIG. 16]
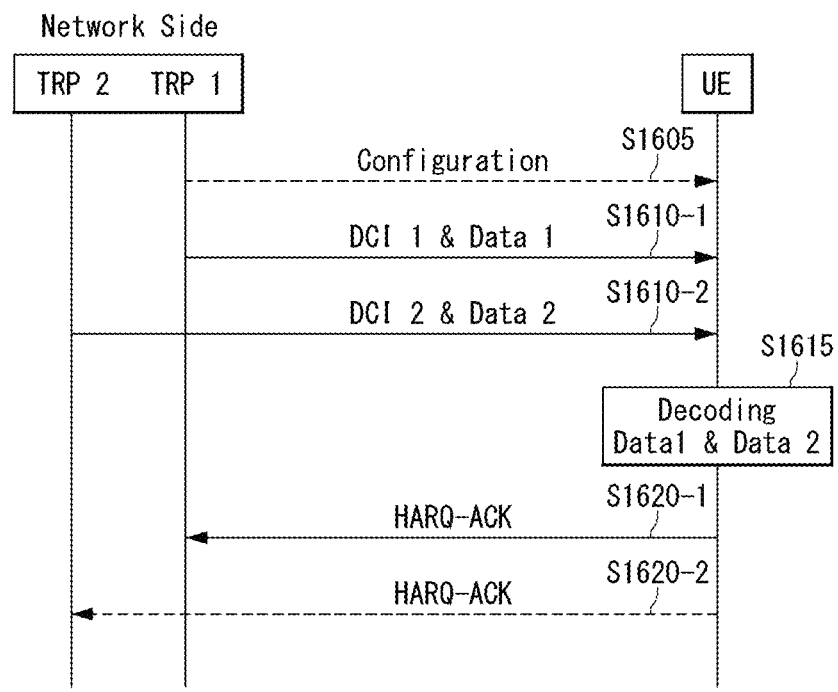
[FIG. 17]
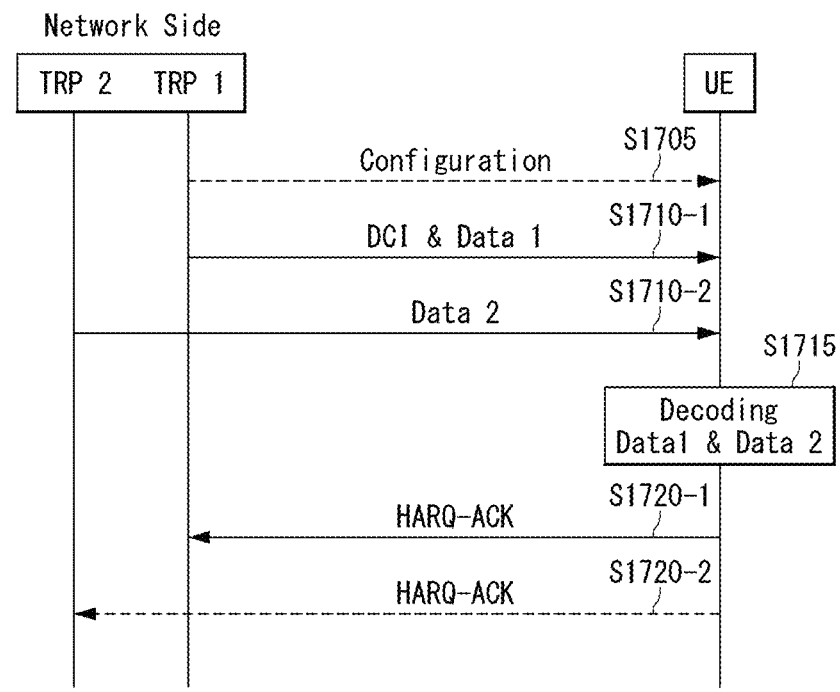

[FIG. 18]
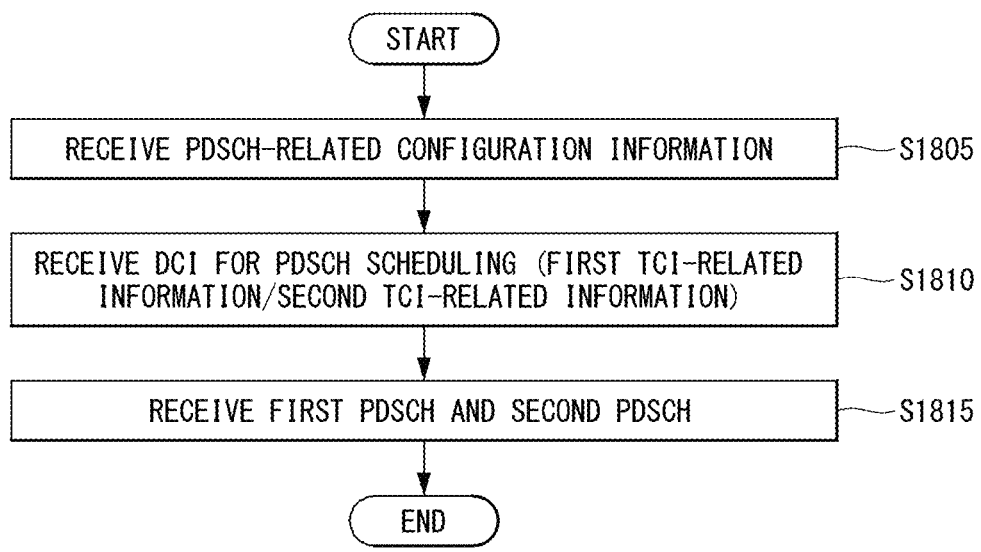
[FIG. 19]
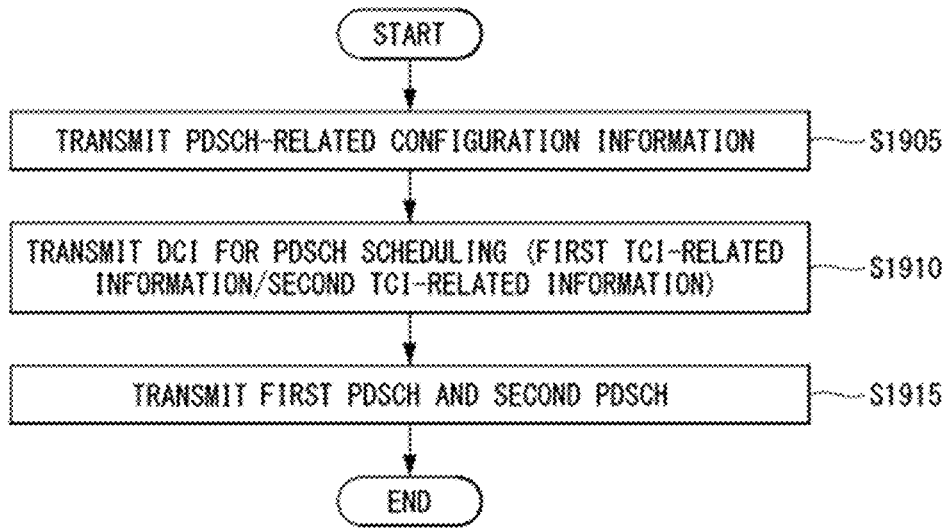

[FIG. 20]
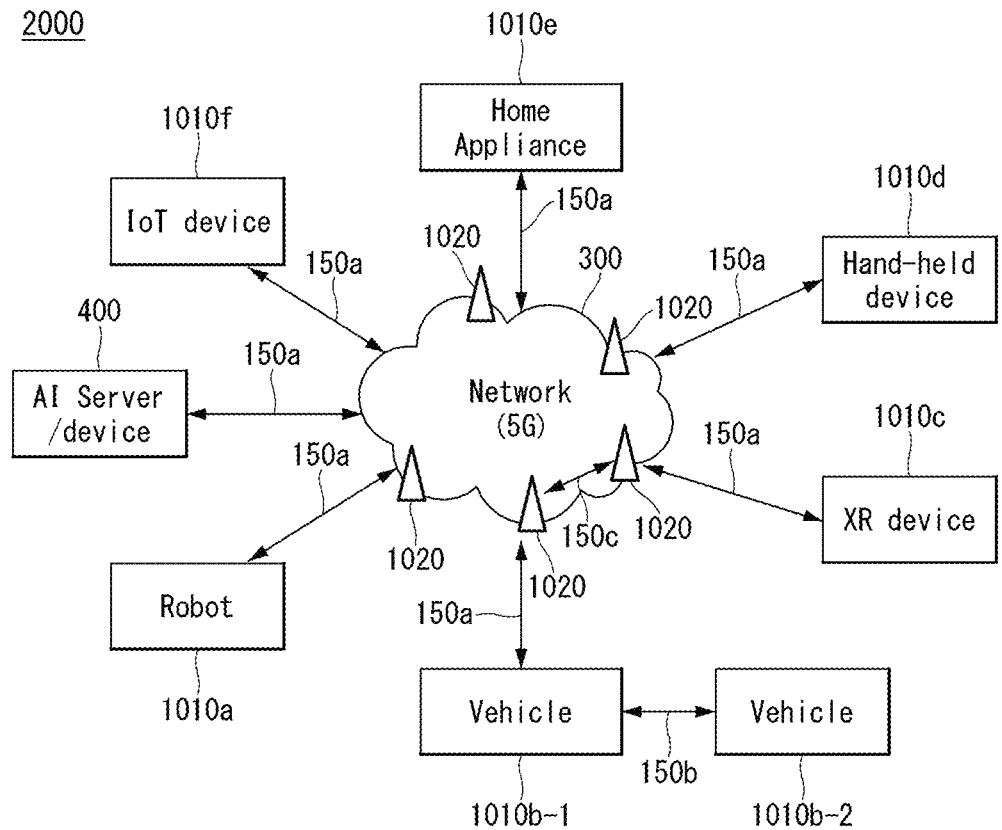
[FIG. 21]
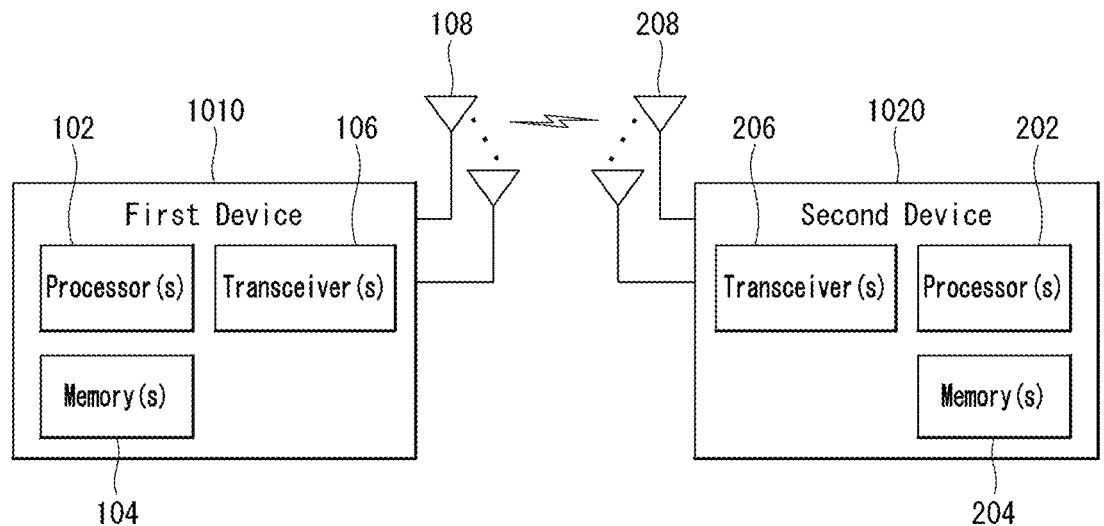

[FIG. 22]
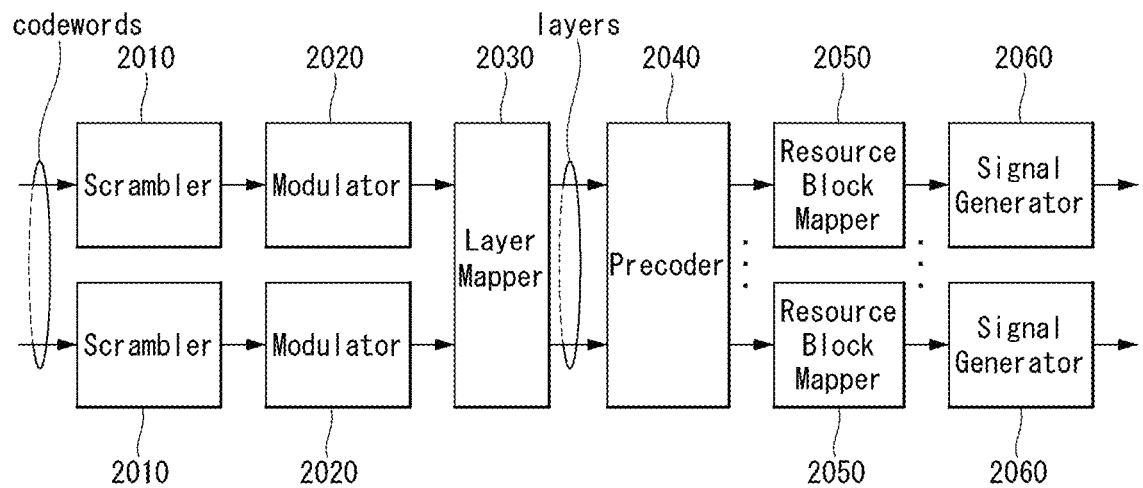
[FIG. 23]
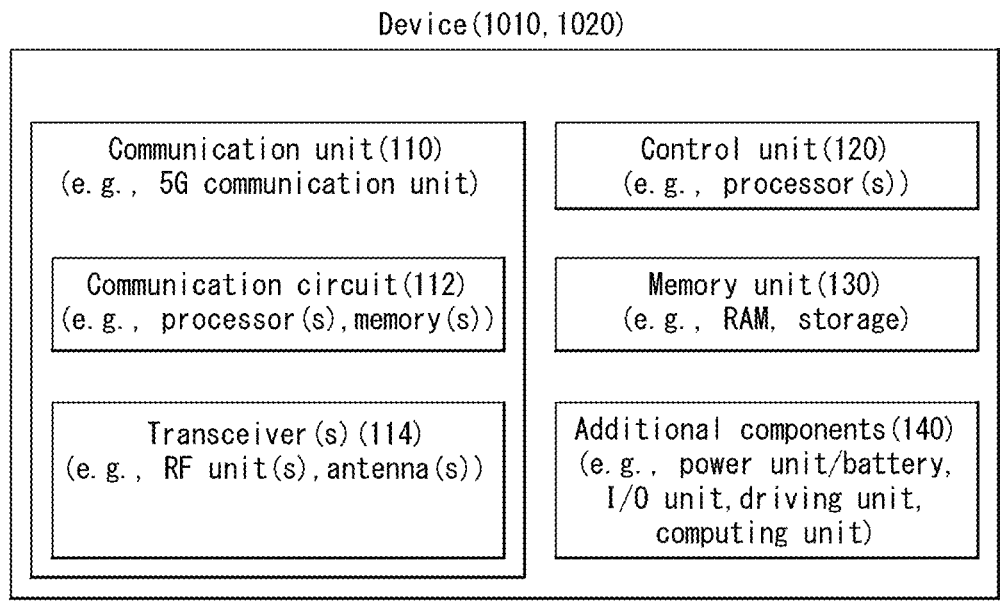

[FIG. 24]
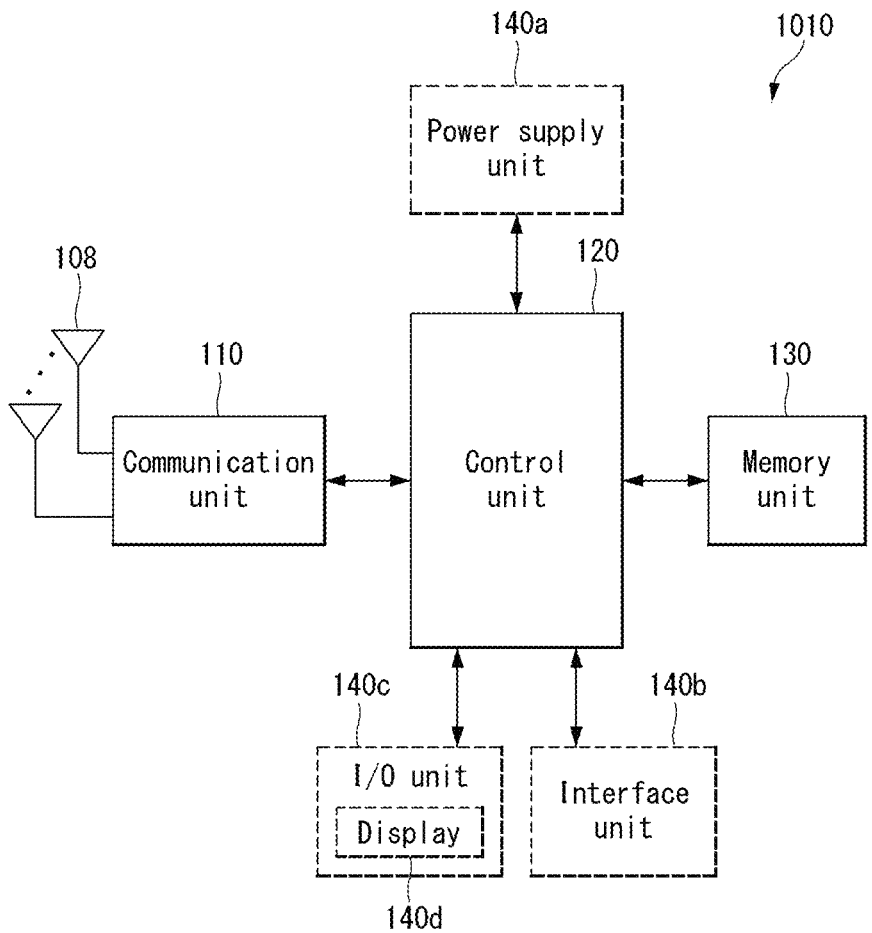
[FIG. 25]
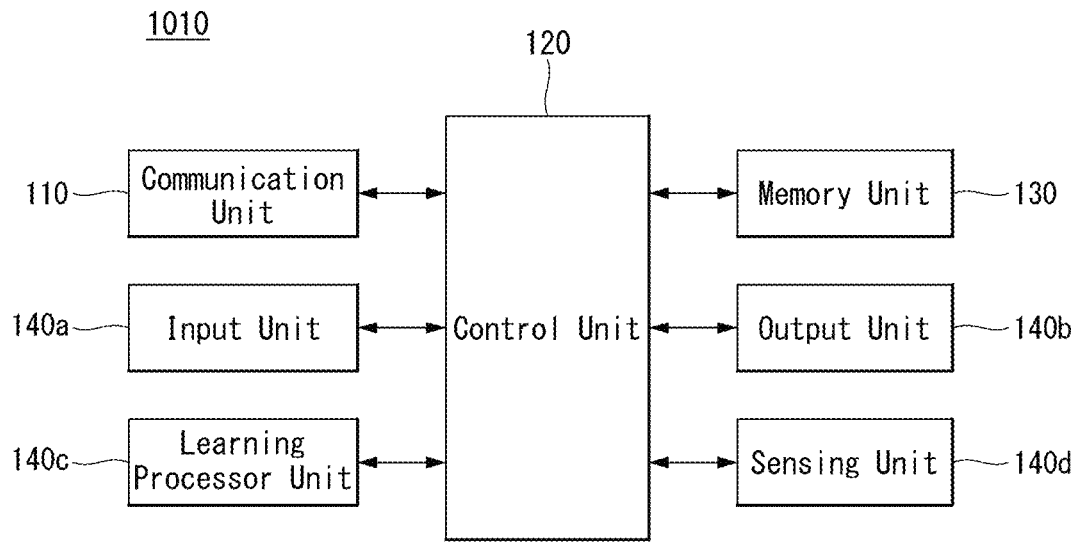

[FIG. 26]
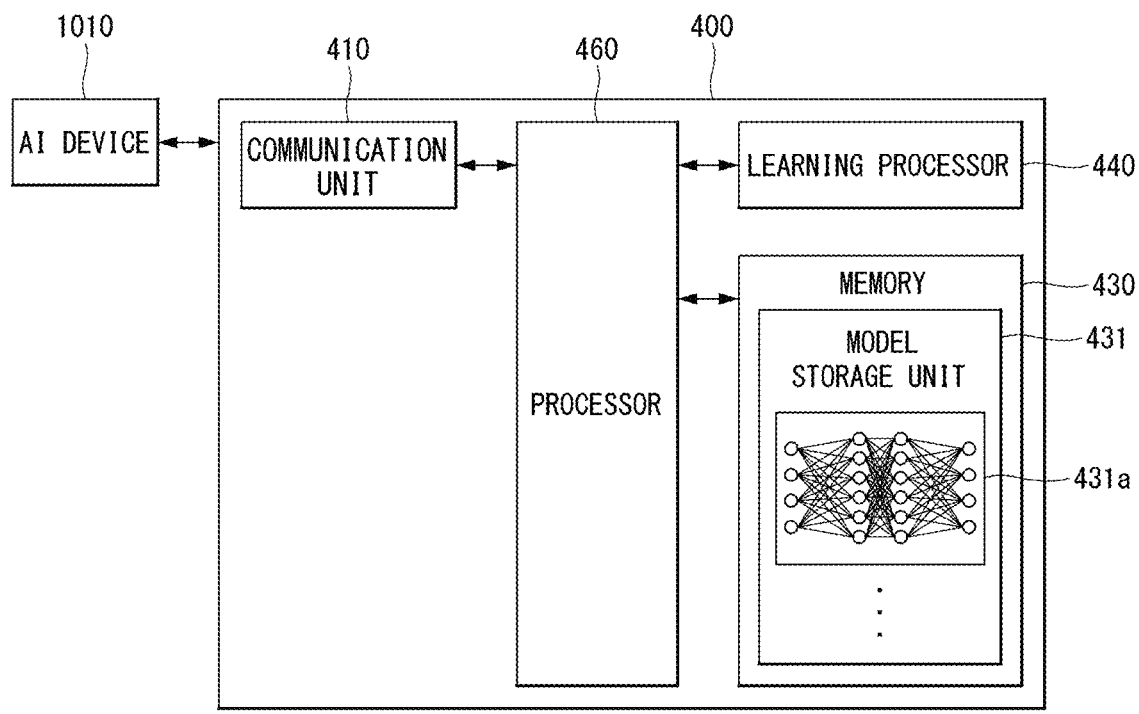

METHOD FOR DETERMINING TRANSMISSION BLOCK SIZE AND TRANSMITTING AND RECEIVING DATA IN WIRELESS COMMUNICATION SYSTEM, AND DEVICE FOR SAME

CROSS-REFERENCE TO RELATED APPLICATIONS

This application is the National Stage filing under 35 U.S.C. § 371 of International Application No. PCT/KR2020/002094, filed on Feb. 14, 2020, which claims the benefit of Korean Patent Application No. 10-2019-0037390, filed on Mar. 29, 2019, Korean Patent Application No. 10-2019-0037391, filed on Mar. 29, 2019, Korean Patent Application No. 10-2019-0100023, filed on Aug. 15, 2019, and Korean Patent Application No. 10-2019-0100022, filed on Aug. 15, 2019, the contents of which are all hereby incorporated by reference herein in their entirety.

TECHNICAL FIELD

The present disclosure relates to a wireless communication system, and more particularly, to a method for determining a transmission block size based on a Multi Input Multi Output (MIMO) method, a method for transmitting and receiving data, and a device supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure provides methods for transmitting and receiving data in consideration of multiple transmission and reception point (TRP)-based cooperative transmission.

The present disclosure provides a method for allocating and/or configuring a frequency resource region for data transmission/reception of a plurality of TRPs based on a non-overlap frequency resource region.

Technical objects to be achieved in the disclosure are not limited to the aforementioned technical objects, and other technical objects not described above may be evidently understood by a person having ordinary skill in the art to which the disclosure pertains from the following description.

Technical Solution

A method for a user equipment (UE) to receive a physical downlink shared channel (PDSCH) in a wireless communication system, the method includes: receiving configuration information related to the PDSCH; receiving downlink control information (DCI) for scheduling the PDSCH, the DCI including a first transmission configuration indication (TCI)-related information and a second TCI-related information; and receiving a first PDSCH and a second PDSCH on the basis of the configuration information and the DCI, in which, based on a predefined rule, a first frequency resource region for the first PDSCH may be configured according to the first TCI-related information and a second frequency resource region for the second PDSCH may be configured according to the second TCI-related information, and a transport block size related to the reception of the first PDSCH and the reception of the second PDSCH may be determined on the basis of the first frequency resource region.

The first TCI-related information may be information to which a first index is mapped among pieces of TCI-related information configured for the UE.

The method may further include: receiving configuration information on the first TCI-related information and the second TCI-related information through higher layer signaling, in which the first TCI-related information may be associated with a first transmission unit for transmitting the first PDSCH, and the second TCI-related information may be associated with a second transmission unit for transmitting the second PDSCH.

Based on the precoding information configured to a wideband precoding resource, the first frequency resource region may be configured to a first half of an entire frequency resource region allocated to the UE, and the second frequency resource region may be configured to a remaining half of the entire frequency resource region.

Based on the precoding information configured to one of (i) a precoding resource group configured to size 2 or (ii) a precoding resource group configured to size 4, the first frequency resource region and the second frequency resource region may be configured to cross each other in units of precoding resource groups. Within the entire frequency resource region allocated to the UE, the first frequency resource region may be configured in even-numbered precoding resource groups, and the second frequency resource region may be configured in odd-numbered precoding resource groups.

A user equipment (UE) receiving a physical downlink shared channel (PDSCH) in a wireless communication system includes: one or more transceivers; one or more processors; and one or more memories configured to store instructions for operations executed by the one or more processors and be connected to the one or more processors, in which the operations may include: receiving downlink control information (DCI) for scheduling the PDSCH, the DCI including a first transmission configuration indication (TCI)-related information and a second TCI-related information, and receiving a first PDSCH and a second PDSCH on the basis of the configuration information and the DCI, based on a predefined rule, a first frequency resource region for the first PDSCH may be configured according to the first TCI-related information and a second frequency resource region for the second PDSCH may be configured according to the second TCI-related information, and a transport block size related to the reception of the first PDSCH and the reception of the second PDSCH may be determined on the basis of the first frequency resource region.

A method for a base station to transmit a physical downlink shared channel (PDSCH) in a wireless communication system includes: transmitting configuration information related to the PDSCH; transmitting downlink control information (DCI) for scheduling the PDSCH, the DCI including a first transmission configuration indication (TCI)-related information and a second TCI-related information, and transmitting a first PDSCH and a second PDSCH on the basis of the configuration information and the DCI, in which, based on a predefined rule, a first frequency resource region for the first PDSCH may be configured according to the first TCI-related information and a second frequency resource region for the second PDSCH may be configured according to the second TCI-related information, and a transport block size related to the reception of the first PDSCH and the reception of the second PDSCH may be determined on the basis of the first frequency resource region.

A base station (BS) transmitting a physical downlink shared channel (PDSCH) in a wireless communication system includes: one or more transceivers; one or more processors; and one or more memories configured to store instructions for operations executed by the one or more processors and be connected to the one or more processors, in which the operations may include: transmitting configuration information related to the PDSCH; transmitting downlink control information (DCI) for scheduling the PDSCH, the DCI including a first transmission configuration indication (TCI)-related information and a second TCI-related information, and transmitting a first PDSCH and a second PDSCH on the basis of the configuration information and the DCI, based on a predefined rule, and a first frequency resource region for the first PDSCH may be configured according to the first TCI-related information and a second frequency resource region for the second PDSCH may be configured according to the second TCI-related information, and a transport block size related to the reception of the first PDSCH and the reception of the second PDSCH may be determined on the basis of the first frequency resource region.

A device includes: one or more memories; and one or more processors functionally connected to the one or more memories, in which the one or more processors control the device to: receive configuration information related to a physical downlink shared channel (PDSCH); receive downlink control information (DCI) for scheduling the PDSCH, the DCI including a first transmission configuration indication (TCI)-related information and a second TCI-related information, and transmit a first PDSCH and a second PDSCH on the basis of the configuration information and the DCI, and based on a predefined rule, a first frequency resource region for the first PDSCH may be configured according to the first TCI-related information and a second frequency resource region for the second PDSCH may be configured according to the second TCI-related information, and a transport block size related to the reception of the first PDSCH and the reception of the second PDSCH may be determined on the basis of the first frequency resource region.

One or more non-transitory computer-readable medium storing one or more instructions, in which the one or more instructions executable by the one or more processors control to: receive, by a user equipment (UE), configuration information related to a physical downlink shared channel (PDSCH); receive, by the UE, downlink control information (DCI) for scheduling the PDSCH, the DCI including a first transmission configuration indication (TCI)-related information and a second TCI-related information; and receive, by the UE, a first PDSCH and a second PDSCH on the basis of the configuration information and the DCI, and based on a predefined rule, a first frequency resource region for the first PDSCH may be configured according to the first TCI-related information and a second frequency resource region for the second PDSCH may be configured according to the second TCI-related information, and a transport block size related to the reception of the first PDSCH and the reception of the second PDSCH may be determined on the basis of the first frequency resource region.

Advantageous Effects

According to an embodiment of the present disclosure, it is possible to efficiently perform MIMO-based data transmission/reception based on a non-overlap frequency resource region.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the disclosure and are incorporated on and constitute a part of this disclosure illustrate embodiments of the disclosure and together with the description serve to explain the principles of the disclosure:

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates physical channels and general signal transmission.

FIG. 7 illustrates an example of a downlink transmission/reception operation.

FIG. 8 illustrates an example of an uplink transmission/reception operation.

FIG. 9 illustrates examples of a multiple transmission and reception point (TRP)-based transmission/reception method;

FIG. 10 illustrates an example of data transmission by a plurality of TRPs in a wireless communication system to which the method proposed in the present disclosure may be applied;

FIG. 11 illustrates examples of FRA scheme 1 and FRA scheme 2 to which the method proposed in the present disclosure may be applied;

FIG. 12 illustrates an example of mapping between a frequency resource to which the method proposed in the present disclosure may be applied and a TRP-related TCI state;

FIG. 13 illustrates another example of the mapping between the frequency resource to which the method proposed in the present disclosure may be applied and the TRP-related TCI state;

FIG. 14 illustrates another example of the mapping between the frequency resource to which the method proposed in the present disclosure may be applied and the TRP-related TCI state;

FIG. 15 illustrates another example of the mapping between the frequency resource to which the method proposed in the present disclosure may be applied and the TRP-related TCI state;

FIG. 16 illustrates an example of signaling in a case where a user equipment (UE) receives multiple DCIs in an M-TRP situation;

FIG. 17 illustrates an example of signaling in a case where the UE receives a single DCI in the M-TRP situation;

FIG. 18 shows an example of an operation flowchart of a terminal receiving data in a wireless communication system to which the method proposed in the present disclosure may be applied.

FIG. 19 shows an example of an operation flowchart of a BS transmitting data in a wireless communication system to which the method proposed in the present disclosure may be applied.

FIG. 20 illustrates a communication system applied to the disclosure.

FIG. 21 illustrates a wireless device which may be applied to the disclosure.

FIG. 22 illustrates a signal processing circuit for a transmit signal.

FIG. 23 illustrates another example of a wireless device applied to the disclosure.

FIG. 24 illustrates a portable device applied to the disclosure.

FIG. 25 illustrates an AI device applied to the present disclosure.

FIG. 26 illustrates an AI server applied to the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
   36.211: Physical channels and modulation
   36.212: Multiplexing and channel coding
   36.213: Physical layer procedures
   36.300: Overall description
   36.331: Radio Resource Control (RRC)

3GPP NR
   38.211: Physical channels and modulation
   38.212: Multiplexing and channel coding
   38.213: Physical layer procedures for control
   38.214: Physical layer procedures for data
   38.300: NR and NG-RAN Overall Description
   36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max}N_f/1000)\cdot T_s=1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_s^\mu \in \{0, \ldots, N_{subframe}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ slot of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ FDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l̄) where k=0, ..., $N_{RB}^\mu N_{sc}^{RB}-1$ is an index on a frequency domain, and l=0, ..., $2^\mu N_{symb}^{(\mu)}-1$ refers to a location of a symbol in a subframe. The index pair (k,l) is used to refer to a resource element in a slot, where l=0, ..., $N_{symb}^\mu - 1$.

The resource element (k,l̄) for the numerology μ and the antenna port p corresponds to a complex value $a_{k,l̄}^{(p,\mu)}$. When there is no risk for confusion or when a specific antenna port or numerology is not specified, the indices p and μ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \qquad \text{[Equation 1[}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Downlink (DL) Transmission and Reception Operation

FIG. 7 illustrates an example of a downlink transmission and reception operation.

The eNB may schedule downlink transmission such as the frequency/time resource, the transport layer, an downlink precoder, the MCS, etc., (S701). Specifically, the eNB may determine a beam for PDSCH transmission to the UE.

In addition, the UE may receive Downlink Control Information (DCI) for downlink scheduling (i.e., including scheduling information of the PDSCH) on the PDCCH (S702).

DCI format 1_0 or DCI format 1_1 may be used for the downlink scheduling and specifically, DCI format 1_1 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization In particular, according to each state indicated in an antenna port(s) field, the number of DMRS ports may be scheduled, and single-user (SU)/Multi-user (MU) transmission scheduling is also available.

In addition, the TCI field consists of 3 bits, and the QCL for the DMRS may be dynamically indicated by indicating a maximum of 8 TCI states according to the TCI field value.

The UE may receive downlink data from the base station on the PDSCH (S703).

When the UE detects a PDCCH including DCI format 1_0 or 1_1, the UE may decode the PDSCH according to an indication by the corresponding DCI. Here, when the UE receives a PDSCH scheduled by DCI format 1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

Uplink Transmission and Reception Operation

FIG. 8 illustrates an example of an uplink transmission and reception operation.

Referring to the FIG. 8, the eNB may schedule uplink transmission such as the frequency/time resource, the transport layer, an uplink precoder, the MCS, etc., (S801). In particular, the eNB may determine a beam for PUSCH transmission of the UE through the beam management operations described above.

And, the UE may receive, from the eNB, DCI for uplink scheduling (i.e., including scheduling information of the PUSCH) on the PDCCH (S802).

DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE may transmit the uplink data to the eNB on the PUSCH (S803).

When the UE detects a PDCCH including DCI format 0_0 or 0_1, the UE may transmit the corresponding PUSCH according to the indication by the corresponding DCI.

Codebook based transmission scheme and non-codebook based transmission scheme are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

Multiple Transmission and Reception Point (TRP)-Related Operation

The coordinated multi point (CoMP) technique is a scheme in a plurality of base stations exchange (e.g., use X2 interface) or utilize channel information (e.g., RI/CQI/PMI/LI, etc.) fed back from the user equipment (UE) to perform cooperative transmission with the UE, thereby effectively controlling interference. According to the scheme used, the cooperative transmission may be divided into joint transmission (JT), coordinated scheduling (CS), coordinated beamforming (CB), dynamic point selection (DPS), dynamic point blacking (DPB), and the like.

The M-TRP transmission scheme in which M TRPs transmit data to one user equipment (UE) may be divided into two, that is, eMBB M-TRP transmission, which is a scheme for significantly increasing a transmission rate, and URLLC M-TRP transmission, which is a scheme for increasing a reception success rate and reducing delay. Hereinafter, for convenience of description in the present disclosure, the method(s) will be described based on "TRP", but in the following description, "TRP" may be replaced with expressions such as a cell, a panel, a transmission point (TP), a base station (gNB, etc.), etc.

In addition, from the perspective of the downlink control information (DCI) transmission, the multiple TRP (M-TRP) transmission scheme may be divided into i) a multiple DCI (M-DCI) based M-TRP transmission scheme in which each TRP transmits a different DCI and ii) a single DCI (S-DCI) based M-TRP transmission scheme in which one TRP transmits the DCI. For example, in the case of the S-DCI, since all scheduling information for data transmitted by the M TRP needs to be transmitted through one DCI, and therefore, may be used in an ideal backhaul (HackHaul, BH) environment that enables dynamic cooperation between two TRPs.

A plurality of schemes may be considered in TDM-based URLLC. As an example, scheme 4 means a scheme in which one TRP transmits a TB in one slot, and has the effect of increasing the data reception probability through the same TB received from several TRPs in several slots. On the other hand, scheme 3 means a scheme in which one TRP transmits a TB through several consecutive OFDM symbols (that is, a symbol group), and may be configured so that several TRPs in one slot transmit the same TB through different symbol groups.

In addition, the UE may recognize a PDSCH/PUSCH (or PUCCH), which is scheduled by the DCI received with different CORESETs (or CORESETs belonging to different CORESET groups/pools), as a PDSCH received from different TRPs or a PUSCH (or PUCCH) transmitted to different TRPs. That is, according to information (e.g., index) on the CORESET group/pool, the UE may distinguish or identify the TRP to be transmitted and received to/and from itself. In addition, the scheme for UL transmission (e.g., PUSCH/PUCCH) transmitted to different TRPs may be equally applied to UL transmission (e.g., PUSCH/PUCCH) transmitted to different panels belonging to the same TRP.

Multiple DCI Based/Single DCI Based Cooperative Transmission

Non-coherent joint transmission (NCJT) is a method in which multiple transmission points (TPs) transmit data to one user equipment (UE) using the same time frequency, and transmits data to different layers using different DMRS (Demodulation Multiplexing Reference Signal) ports between TPs. The TP transmits the data scheduling information to the UE receiving the NCJT as the downlink control information (DCI). In this case, a scheme in which each TP participating in the NCJT transmits scheduling information for data transmitted by itself to the DCI may be referred to as multiple DCI based cooperative transmission (e.g., multi DCI based NCJT). Since each of N TPs participating in the NCJT transmission transmit DL grants (i.e., DL DCI) and PDSCH to the UE, the UE receives N DCIs and N PDSCHs through N TPs.

On the other hand, a scheme in which one representative TP transmits scheduling information for data transmitted by itself and data transmitted by another TP to one DCI may be referred to as single DCI based cooperative transmission (e.g., single DCI based NCJT). In this case, N TPs transmit one PDSCH, but each TP transmits only some layers among multiple layers constituting one PDSCH. For example, when 4 layer data is transmitted, TP 1 may transmit 2 layers and TP 2 may transmit the remaining 2 layers to the UE.

Multiple TPs (or MTRPs) performing NCJT transmission may perform DL data transmission to the UE using the following two schemes.

First, a single DCI based MTRP scheme will be described. The MTRP cooperatively transmits one common PDSCH together, and each TRP participating in the cooperative transmission may transmit the corresponding PDSCH by spatially dividing it into different layers (i.e., different DMRS ports). In this case, the scheduling information for the PDSCH is indicated to the UE through one DCI, and the DCI may include information on which DMRS port uses which QCL RS and QCL type information (It may be different from indicating the QCL RS and TYPE commonly applied to all DMRS ports previously indicated in the DCI). That is, M TCI states are indicated through the TCI field in the DCI (e.g., M=2 in case of 2 TRP cooperative transmission), and QCL RS and type may be identified using M different TCI states for each M DMRS port group. In addition, DMRS port information may be indicated using a new DMRS table.

Second, a multiple DCI based MTRP scheme will be described. MTRP transmits different DCIs and PDSCHs, respectively, and the corresponding PDSCHs overlap each other (in part or all) on frequency and time resources and are transmitted. The corresponding PDSCHs may be scrambled through different scrambling IDs, and the corresponding DCIs may be transmitted through CORESETs belonging to different control resource set (CORESET) groups (or CORESET pools). Here, the CORESET group may be a specific index defined in CORESET configuration information of each CORESET. For example, when CORESET 1 and CORESET 2 are set (or mapped) to index=0 and CORESET 3 and CORESET 4 are set to index=1, CORESETs 1 and 2 belong to CORESET group 0, and CORESETs 3 and 4 may belong to CORESET group 1. Also, when the corresponding index is not defined in CORESET, it may be interpreted as CORESET group 0 (i.e., index=0). When a plurality of scrambling IDs are configured in one serving cell, or a plurality of CORESET groups (e.g., two CORESET groups) are configured, the UE may recognize (or identify) that it will receive data (e.g., PDSCH) in multiple DCI based MTRP operation.

In this case, the information on whether the single DCI based MTRP scheme or the multiple DCI based MTRP scheme may be indicated to the UE through separate signaling or the like. As an example, when multiple cell reference signal (CRS) patterns for MTRP operation for one serving cell are indicated to the UE, PDSCH rate matching for CRS may be set or defined differently depending on whether it is the single DCI based MTRP scheme or the multiple DCI based MTRP scheme.

In addition, schemes as illustrated in FIG. 9 may be considered as a transmission/reception method for improving reliability using multi-TRP-based transmissions. FIG. 9 illustrates examples of a multiple transmission and reception point (TRP)-based transmission/reception method.

FIG. 9(a) illustrates an example of a case in which the layer group transmitting the same codeword (CW)/transport block (TB) corresponds to different TRPs. In this case, the layer group may mean a layer set including one or more layers. In this case, there is an advantage in that the amount of transmission resources increases due to the number of layers, and thus, (robust) channel coding of a low code rate may be used for the transport block (TB). In addition, since the channels transmitted from a plurality of TRPs are different, it can be expected to improve the reliability of the received signal based on the diversity gain.

FIG. 9(b) illustrates an example of transmitting different CWs through layer groups corresponding to different TRPs. In this case, it may be assumed that TBs corresponding to a first CW (CW #1) and a second CW (CW #2) are the same. Accordingly, the scheme illustrated in FIG. 9(b) can be viewed as an example of repeated transmission of the same TB. In the case of FIG. 9(b), the code rate corresponding to the TB may be higher than that of FIG. 9(a). However, according to the channel environment, the code rate may be adjusted by indicating different redundancy version (RV) values for encoding bits generated from the same TB, or the modulation order of each CW can be adjusted.

In addition, as in FIG. 9, the same TB is repeatedly transmitted through different layer groups, and the scheme capable of increasing the data reception probability by transmitting each layer group by different TRPs and/or panels may be considered. Such a scheme may be referred to as a spatial division multiplexing (SDM)-based M-TRP URLLC transmission scheme. Layer(s) belonging to different layer groups may be transmitted through DMRS port(s) belonging to different DMRS code division multiplexing (CDM) groups, respectively.

In addition, the above-described multi-TRP-based transmission related content has been described based on the SDM scheme using different layers, but is a frequency division multiplexing (FDM) scheme based on different frequency domain resources (e.g., RB, PRB (aggregation)) and/or can be extended and applied to a time division multiplexing (TDM) scheme based on different time domain resources (e.g., slots, symbols, sub-symbols, etc.).

Hereinafter, Table 5 illustrates examples of schemes related to the above-described multi-TRP-based transmission.

TABLE 5

Schemes for multi-TRP based URLLC, scheduled by single DCI at least, are clarified as following:

Scheme 1 (SDM): n (n <= Ns) TCI states within the single slot, with overlapped time and frequency resource allocation
Scheme 1a: Each transmission occasion is a layer or a set of layers of the same TB, with each layer or layer set is associated with one TCI and one set of DMRS port(s). Single codeword with one RV is used across all spatial layers or layer sets. From the UE perspective, different coded bits are mapped to different layers or layer sets with the same mapping rule as in Rel-15.
Scheme 1b: Each transmission occasion is a layer or a set of layers of the same TB, with each layer or layer set is associated with one TCI and one set of DMRS port(s). Single codeword with one RV is used for each spatial layer or layer set. The RVs corresponding to each spatial layer or layer set can be the same or different.
Scheme 1c: One transmission occasion is one layer of the same TB with one DMRS port associated with multiple TCI state indices, or one layer of the same TB with multiple DMRS ports associated with multiple TCI state indices one by one.
For Scheme 1a and 1c, the same MCS is applied for all layers or layer sets.
Scheme 2 (FDM): n (n <= Nf) TCI states within the single slot, with non-overlapped frequency resource allocation. Each non-overlapped frequency resource allocation is associated with one TCI state. Same single/multiple DMRS port(s) are associated with all non-overlapped frequency resource allocations.
Scheme 2a: Single codeword with one RV is used across full resource allocation. From UE perspective, the common RB mapping (codeword to layer mapping) is applied across full resource allocation.
Scheme 2b: Single codeword with one RV is used for each non-overlapped frequency resource allocation. The RVs corresponding to each non-overlapped frequency resource allocation can be the same or different.
For scheme 2a, same MCS is applied for all non-overlapped frequency resource allocations
Scheme 3 (TDM): n (n <= Nt1) TCI states within the single slot, with non-overlapped time resource allocation. Each transmission occasion of the TB has one TCI and one RV with the time granularity of mini-slot. All transmission occasion (s) within the slot use a common MCS with same single or multiple DMRS port(s). RV/TCI state can be same or different among transmission occasions.
Scheme 4 (TDM): n (n <= Nt2) TCI states with K (n <= K) different slots. Each transmission occasion of the TB has one TCI and one RV. All transmission occasion (s) across K slots use a common MCS with same single or multiple DMRS port(s). RV/TCI state can be same or different among transmission occasions.

In the present disclosure, '/' may mean including (and) all of the content separated by/or including only a part of the separated content (or). In addition, in the present disclosure, for convenience of description, the following terms are used uniformly. However, the use of these terms does not limit the technical scope of the present disclosure.

The transmission and reception point (TRP) described in the present disclosure may collectively refer to an object that performs transmission and reception of data to and from a UE. For example, the TRP described herein may be the same or similar concept to a transmission point (TP), a base station, a panel, an antenna array, a transmission and reception unit (transmission and reception unit). As an example, the multiple TPs and/or multiple TRPs described herein may be included in one base station or included in a plurality of base stations.

When the base station transmits and receives data (e.g., DL-SCH, PDSCH, etc.) to and from the UE, a non-coherent joint transmission (NCJT) scheme may be considered. Here, the NCJT may mean cooperative transmission that does not consider interference (i.e., no coherence). That is, the NCJT scheme may correspond to a transmission scheme of the MIMO layer(s) performed from two or more TPs without adaptive precoding across the TPs. For example, the NCJT may be a scheme in which the base station(s) transmit data to one UE through multiple TPs using the same time resource and frequency resource. In the case of the scheme, the multiple TPs of the base station(s) may be configured to transmit data to the UE through different layers using different demodulation reference signal (DMRS) ports.

Based on the NCJT scheme, the base station may send (or transmit) information for scheduling corresponding data to the UE receiving data or the like through the downlink control information (DCI). In this case, the scheme in which the base station(s) participating in the NCJT scheme transmits scheduling information for data transmitted by itself through each TP through the DCI may be referred to as a multi-DCI based NCJT. On the other hand, the scheme for transmitting scheduling information for data transmitted by itself through the representative TP among the TPs of the base station(s) participating in the NCJT scheme and data transmitted through other TP(s) through one DCI may be referred to as a single-DCI based NCJT. Although the embodiments and methods described in the present disclosure are mainly described based on the single-DCI based NCJT, it goes without saying that they can be extended and applied to the multi-DCI based NCJT.

Hereinafter, in the present disclosure, when considering the cooperative transmission (e.g., NCJT) between a plurality of base stations (e.g., multiple TP/TRPs of one or more base stations, etc.) and the UE in a wireless communication system, methods that may be proposed will be described. The methods in the present disclosure described below are described based on one or more TP/TRPs of the base station(s), but the methods may also be applied to transmission based on one or more panels of the base station(s) in the same or similar scheme.

FIG. 10 illustrates an example of data transmission by a plurality of TRPs in a wireless communication system to which the method proposed in the present disclosure may be applied. FIG. 10 is merely for convenience of explanation, and does not limit the scope of the present disclosure.

Referring to FIG. 10, it is assumed that a plurality of TRPs (e.g., first TRP and second TRP) transmit data using different frequency resources (e.g., frequency resource group (FRG)). For example, the FRG may indicate a set of frequency resources according to a predetermined criterion.

In FIG. 10, a case in which overlap occurs in the time domain between different FRGs has been described as an example, but it may be extended and applied even if some overlapping or non-overlapping cases occur. As illustrated in FIG. 10, when different TRPs transmit signals (e.g., data, PDSCH, etc.) to the UE, since the channels from the plurality of TRPs are different, the reliability improvement of the received signal may be expected based on the diversity gain. In this case, in order to allocate different frequency resources to different TRPs using the single DCI, the following two schemes may be considered.

For example, a scheme in which a frequency resource allocation (FRA) field in the DCI indicates the scheduling frequency resource for all TRPs, and different TRPs share corresponding frequency resources based on signaling (e.g., higher layer signaling, DCI, etc.) and/or predefined rules may be considered (hereinafter, referred to as frequency resource allocation (FRA) scheme 1). As another example, a scheme in which the FRA field in the DCI indicates a scheduling frequency resource for a specific TRP, and frequency resources mapped to other TRPs are allocated based on signaling (e.g., higher layer signaling, DCI, etc.) and/or a predefined rule may be considered (hereinafter referred to as frequency resource allocation (FRA) scheme 2).

FIG. 11 illustrates examples of FRA scheme 1 and FRA scheme 2 to which the method proposed in the present disclosure may be applied. FIG. 11 is merely for convenience of description and does not limit the scope of the present disclosure.

Referring to FIG. 11, FIG. 11(a) illustrates an example of the FRA scheme 1, and FIG. 11(b) illustrates an example of the FRA scheme 2. As in FIG. 11(a), a specific frequency resource region may be indicated by the FRA field in the single DCI, and a first FRG (FRG #1) and a second FRG (FRG #2) by specific signaling and/or rules may be divided. Alternatively, as in FIG. 11(b), the frequency resource region for the first FRG may be indicated by the FRA field in the single DCI, and the frequency resource region for the second FRG may be configured (or allocated) based on the frequency resource region for the first FRG, by specific signaling and/or rules.

In addition, in relation to a scheme for defining a frequency resource (FR) as a reference for the calculation of a transport block (TB) size, the following two schemes may be considered. For example, a scheme for calculating the TB size in consideration of all FRs allocated to a plurality of TRPs may be considered (hereinafter referred to as reference FR definition scheme 1). As another example, a scheme for calculating the TB size in consideration of all FRs allocated to a plurality of TRPs may be considered (hereinafter, referred to as reference FR definition scheme 2). As an example, a specific TRP may be set or defined as the TRP having the lowest TCI status index. Regarding the method for defining the FR, the reference FR definition scheme 2 may be interpreted as a repeated transmission form of a single TB. In this case, there is an advantage that a different modulation order and/or a redundancy version (RV) or the like may bee applied to each TB.

Table 6 illustrates contents related to a number of combinations related to the above-described FRA schemes 1/2 and the above-described reference FR definition schemes 1/2.

TABLE 6

| | FRA scheme 1 | FRA scheme 2 |
|---|---|---|
| Reference FR definition scheme 1 | Signaling/rule required for dividing divide frequency resources. No effect on TB size calculation scheme. | Signaling/rule required for frequency allocation of different TRPs.. Requiring signaling/rule for TB size calculation |
| Reference FR definition scheme 2 | Signaling/rule required for dividing divide frequency resources. Requiring signaling/rule for TB size calculation Separate MCS/RV indication available | Signaling/rule required for frequency allocation of different TRPs.. No effect on TB size calculation scheme. Separate MCS/RV indication available |

Among the contents described in Table 6 above, when an additional UE operation description is required and an additional function may be provided, the present disclosure proposes a signaling method and an operation method of the UE/base station. Specifically, in the present disclosure, a rule and/or signaling method between a base station and the UE for allocating different frequency resources for different TRPs through the single DCI is proposed. In addition, in the present disclosure, a method for mapping TCI states related to different TRPs for specific frequency resources to support M-TRP transmission and reception is proposed.

The embodiments described below are only divided for convenience of description, and some configurations and/or methods of one embodiment may be substituted with configurations and/or methods of other embodiments, or may be applied in combination with each other.

First Embodiment

In the present embodiment, in relation to the above-described FRA scheme 1, a method for separating frequency resources configured and/or indicated through the single DCI and mapping the separated frequency resources to TCI states related to different TRPs is proposed.

In the present embodiment, the methods are described by being divided into method 1-1 and method 1-2, but this is only for convenience of description, and the schemes described in method 1-1 and method 1-2 are substituted or combined with each other and may be applied. As an example, the method 1-2 may be a method for calculating a TB size related to the method 1-1.

Method 1-1)

When multiple TCI states are indicated to the UE, frequency resources corresponding to each TCI state may be different within a frequency resource region indicated through the single DCI.

For example, when the precoding granularity is set or indicated to 2 or 4 to the UE, the frequency resource corresponding to each TCI state may be allocated to the UE in units of PRG set composed of a plurality of precoding resource block group (PRG)(s). Here, the precoding granularity may mean a unit of performing precoding and/or a PRG size, or the like. As an example, successive PRG groups may be configured or defined to alternately correspond to different TCI states. As an example, the even-numbered PRG set(s) may be mapped to the first TCI state, and the odd-numbered PRG set(s) may be mapped to the second TCI state. Here, the PRG set may include one or more PRGs. Information on the number of PRGs constituting one PRG set may be predefined or may be set or indicated through signaling (e.g., higher layer signaling and/or DCI, etc.).

As another example, when the precoding granularity is configured or indicated to the UE as a wideband characteristic, the frequency resource corresponding to each TCI state may be allocated to the UE as a contiguous (i.e., consecutive) specific frequency resource set. For example, a frequency resource corresponding to each TCI state may be allocated to the UE based on an RB set/RBG set composed of resource blocks (RBs)/resource block group (RBGs). In this case, the sizes of the RB sets/RBG sets related to different TCI states may be the same as or equal to each other. As an example, when the frequency resource region configured for the UE is configured (or divided) into two consecutive RB sets (e.g., the first RB set, the second RB set), the first TCI state may be mapped to the first RB set, and the second TCI state may be configured or defined to be mapped to the second RB set.

To operate according to the scheme of the above-described examples, the base station may configure or indicate a specific scheme (or mode) to the UE by signaling (e.g., higher layer signaling and/or DCI, etc.) and/or a predefined rule. For example, when the UE succeeds in CRC check using a specific RNTI, the UE may be configured to interpret the DCI for frequency resource allocation according to at least one of the above-described examples.

In this regard, the DCI includes a single field for frequency resource allocation. Therefore, in order to allocate different frequency resources for different TRPs to the UE through the single DCI, rules and/or signaling schemes need to be defined between the base station and the UE. In addition, in order to support the M-TRP transmission, a method capable of corresponding (or mapping) TCI states related to different TRPs to a specific frequency resource may also be required.

Hereinafter, the frequency resource allocation schemes (e.g., Type 0 and Type 1) described in the present disclosure may be classified according to a method for allocating and/or indicating frequency resources. As an example, the Type 0 scheme defines a resource unit called a resource block group (RBG) composed of a plurality of RBs, and may mean a scheme for allocating frequency resources based on bitmap information defined in units of RBGs. The Type 1 scheme may refer to a scheme for allocating frequency resources composed of consecutive RBs in RB units.

First, in order to allocate different frequency resources to different TRPs through the single DCI, a method for using a PRG set composed of one or more PRGs as described above may be considered.

FIG. 12 illustrates an example of mapping between a frequency resource to which the method proposed in the present disclosure may be applied and a TRP-related TCI state. FIG. 12 is merely for convenience of description and does not limit the scope of the present disclosure.

Referring to FIG. 12, for the Type 0 (e.g., RBG size 4)) scheme and the Type 1 scheme related to resource allocation, the size of the PRG is configured to 2 and/or indicated, and the size of the PRG set is set to 1 and/or the scheme in the case indicated is suggested. In FIG. 12, CRB represents a common resource block, PRG represents a precoding resource block group (precoding resource block group), and BWP represents a bandwidth part. The scheme described in FIG. 12 may be extended and applied to PRGs of different sizes and/or PRG sets of other sizes.

For example, when the size of the PRG set is 1, one PRG set may be defined as a frequency resource related to one PRG configured and/or indicated to the UE. In this case, the frequency resources scheduled (or allocated) to the UE may be alternately mapped to TCI states related to different TRPs in units of PRG sets. When the size of the PRG set is 2, one PRG set may be composed of two PRGs, and the frequency resources scheduled (or allocated) to the UE may be alternately mapped to TCI states related to different TRPs in units of the corresponding PRG sets.

The above example may correspond to an example of a method in which TCI states related to different TRPs are alternately mapped in units of a predetermined PRG set based on a frequency resource scheduled for the UE. As a specific example, among the two TCI states indicated to the UE, a 1st TCI state (e.g., a first TCI state) may be configured and/or indicated to corresponds to (or maps) the odd-numbered PRG set, and a 2nd TCI state (e.g., a second TCI state) may be configured and/or indicated to correspond to an even-numbered PRG set. In this case, the PRG set may be configured to correspond to the PRG set based on a low frequency index in a frequency resource scheduled for the UE, and may correspond in the reverse order. The mapping order may be based on a predefined rule, or may be configured and/or indicated through specific signaling (e.g., higher layer signaling, DCI, etc.). Through this, since frequency resources related to different TRPs are evenly spread in the scheduling band allocated to the UE through the DCI, a frequency multiplexing gain may be expected, and the size of the PRG set may be adjusted, so there is a technical effect that may control the size of the frequency resource to be used.

The example described in FIG. 12 may correspond to a scheme in which a PRG set is defined based on a frequency resource scheduled for the UE, and different TCI states are mapped to an odd-numbered PRG set and an even-numbered PRG set. Alternatively, a method for defining a PRG set based on a bandwidth part (BWP) through which a PDSCH is transmitted and defining a mapping relationship with a specific TCI state based on the corresponding PRG set may be considered.

FIG. 13 illustrates another example of the mapping between the frequency resource to which the method proposed in the present disclosure may be applied and the TRP-related TCI state. FIG. 13 is merely for convenience of description and does not limit the scope of the present disclosure.

Referring to FIG. 13, for the Type 0 (e.g., RBG size 4)) scheme and the Type 1 scheme related to resource allocation, the size of the PRG is configured to 4 and/or indicated, and the size of the PRG set is set to 1 and/or the scheme in the case indicated is suggested. In FIG. 13, CRB represents a common resource block, PRG represents a precoding resource block group (precoding resource block group), and BWP represents a bandwidth part. The scheme described in FIG. 13 may be extended and applied to PRGs of different sizes and/or PRG sets of other sizes.

Referring to the case of Type 0, since the PRG set is defined based on the BWP through which the PDSCH is transmitted, within the frequency resource scheduled for the UE (unlike the case of FIG. 12), TCI states related to the same TRP may be associated with a set of contiguous PRGs. When applying the scheme proposed in FIG. 13 compared to the case of FIG. 12 described above, there is a technical effect that may divide the frequency resource region in a semi-static manner between different TRPs. In addition, since the scheduling between TRPs does not affect each other, the scheduling complexity may be reduced in each TRP, and the technical effect of increasing the scheduling freedom may also be obtained.

In addition, in the scheme described in FIGS. 12 and 13, frequency resources related to different TRPs may be considered to be overlap, partial overlap, and/or non-overlap in the time domain.

Next, when the precoding granularity (i.e., the size of PRG) set and/or indicated to the UE corresponds to a wideband, a method for mapping the frequency resource regions allocated to the UE through the DCI to be the same or equally divided and mapped to different TCI states may also be considered.

FIG. 14 illustrates another example of the mapping between the frequency resource to which the method proposed in the present disclosure may be applied and the TRP-related TCI state. FIG. 14 is merely for convenience of description and does not limit the scope of the present disclosure.

Referring to FIG. 14, when the UE is allocated the leftmost four RBGs in Type 0, the same frequency resource may be mapped to different TRPs in RGB and/or RB units. For the two cases in which the UE is allocated three RBGs, the size of frequency resources related to different TRPs may vary depending on whether to divide in RBG or RB units. In the Type 1, frequency resources may be mapped for different TRPs by being divided in RB units. In addition, in the case of both the Type 0 and Type 1, the sizes of resources mapped to different TRPs may be different depending on units of resource allocation. In this case, the size of the resource associated with the specific TRP may be larger. In order to avoid this, a scheme in which the base station schedules resources may also be considered so that the UE may assume that the sizes of frequency resources related to different TRPs are the same.

As in the example in FIG. 14, when the frequency resource region allocated to the UE through the single DCI is identically or equally divided and mapped to different TCI states, there is an advantage of being able to allocate a consecutive frequency resource of the widest area for each of the two TRPs, and improving the channel estimation performance for a channel related to each TRP by providing the maximum PRG size. When the precoding granularity is configured and/or indicated to the UE as a wideband, it may be used for the purpose of helping the channel estimation scheme by transmitting, to the UE, information that the consecutive frequency resource to which the same precoding is applied is allocated. By utilizing this, as in the above proposed operation, it can be utilized for the purpose of indicating that consecutive frequency resources to which the same precoding is applied to each of the different TRPs are allocated.

In relation to the above-described proposed scheme, the 1st TCI state (i.e., the first TCI state) among the two TCI states indicated to the UE may be configured to correspond to the first RB set and/or RBG set (based on the low frequency index in the frequency resource scheduled for the UE) and the second TCI state (i.e., the second TCI state) may be configured to correspond to the second RB set and/or the RBG set. The reverse order is also possible, and the mapping order may be configured and/or indicated based on a predefined rule or through specific signaling (e.g., higher layer signaling, DCI, etc.).

In addition, when different frequency resources, in particular, different RB sets and/or RBG sets are mapped to different TCI states indicated to the UE as in the above-described proposed scheme, from the perspective of the UE, the PRG (or size of the PRG) (that is, precoding granularity) may be defined as the corresponding RB set and/or RBG set. For example, when the PRG is configured to the wideband and the number of TCI states is greater than 1, the UE may assume that only the antenna port included in the band corresponding to the scheduled bandwidth (BW) divided by the number of TCI states is the same antenna port. And/or, in this case, the UE may assume that the scheduled bandwidth divided by the number of TCI states is the PRG. Alternatively, a separate precoding granularity for supporting the above-described operation may be defined. As an example, a separate precoding granularity is defined that the PRG is equal to a sub-wideband, that is, a scheduled bandwidth divided by the number of TCI states, and the UE may be configured to operate according to the above-described proposed scheme.

In addition, as described above, since the Type 0 scheme and the Type 1 scheme related to the frequency resource allocation may have different minimum units of frequency allocation (e.g., RBG units in the case of Type 0 and RB units in the case of Type 1), even in the above-described proposed schemes, the minimum unit of frequency allocation for defining frequency resources related to different TCI states may vary depending on the frequency allocation scheme.

In addition, in the scheme described in FIG. 14, frequency resources related to different TRPs may be considered to be overlap, partial overlap, and/or non-overlap in the time domain.

In addition, the scheme of the following example may be applied to define the sizes of RB sets and/or RBG sets related to different TCI states in the above-described proposed scheme identically or equally. For example, in the Type 0 scheme, when the total number of RBGs scheduled to the UE through the DCI is named N^sched_RBG, in the case where a value of mod(N^sched_RBG, 2) is 0, the number of RB sets related to each TCI state may be defined or configured to (N^sched_RBG/2). On the other hand, when the value of mod(N^sched_RBG, 2) is not 0, the number of RBGs of the RB set related to the first TCI state may be ceil(N^sched_RBG/2), and the RBGs of the RB set related to the first TCI state The number may be defined or set as ceil(N^sched_RBG/2)−1. For example, in the Type 1 scheme, when the consecutive number of RBs scheduled to the UE through the DCI is named N_RBs, in the case where a value of mod(L_RBs, 2) is 0, the number of RB sets related to each TCI state may be defined or configured to (L_RBs/2). On the other hand, when the value of mod(L_RBs, 2) is not 0, the number of RBGs of the RB set related to the first TCI state may be ceil(L_RBs/2), and the RBGs of the RB set related to the first TCI state The number may be defined or set as ceil(L_RBs/2)−1. In the above examples, mod(x, y) may mean a function for calculating a residual value obtained by dividing x by y, and ceil(x) may mean a rounding function with respect to x. In the above examples, ceil(x) may be replaced with a floor(x) function (i.e., a rounding function for x) or a round(x) function (i.e., a rounding function for x).

When considering the reference FR definition scheme 1 for the above-described proposed schemes, since the frequency resources indicated through the DCI coincide with the sum of the frequency resources used for PDSCH transmission through different TRPs, it may not be necessary to change the transport block (TB) size calculation scheme. However, when considering the reference FR definition scheme 2, a new scheme for calculating the TB size needs to be considered. Hereinafter, in Method 1-2, a method for calculating the TB size when the reference FR definition scheme 2 is supported with respect to the FRA scheme 1 is proposed.

Method 1-2)

When the UE calculates the TB size, the UE may calculate the TB size based on the frequency resource to which the TCI state associated with a specific TRP is mapped. Specifically, the UE may recognize to which TCI state a frequency resource scheduled through the single DCI is mapped according to the scheme of the above-described method 1-1, that is, to which TRP. Therefore, when the UE calculates the TB size, the UE may calculate the TB size based on the frequency resource to which the TCI state related to a specific TRP is mapped based on the signaling between the base station and the UE (e.g., higher layer signaling, DCI, etc.) and/or the predefined rule.

As an example of a method for using a predefined rule between the base station and the UE, the UE may be defined to calculate the TB size based on the frequency resource mapped to the first TCI state (e.g., TCI state index #0). When the scheme is applied, unlike applying the frequency resource scheduled through the DCI to the calculation of the TB size, only a part of the scheduled frequency resource is applied to the calculation of the TB size. As an example of a method for using signaling between the base station and the UE, a method using a predefined DCI field may be considered. For example, when the above-described method 1-1 is applied, the DMRS table may be optimized and the field for the DMRS port indication may be reduced. Accordingly, the UE may be configured to differently interpret the TB information field for indicating some (e.g., most significant bit (MSB)(s), least significant bit (LSB)(s), and/or modulation and coding scheme (MCS)/redundancy version (RV)/new data indicator (NDI) of the second TB) of the bits for defining the corresponding field In addition, the method for calculating the TB size based on the above-described proposed scheme may be applied to the following examples. Hereinafter, the following examples are only divided for convenience of description, and one or more examples may be combined and applied.

For example, the UE may be defined or configured to calculate the TB size based on the frequency resource mapped to the second TCI state. That is, one TCI state among the two TCI states (e.g., first TCI state and second TCI state) may be selected as a fixed rule (e.g., default TCI state), and the UE may be defined or configured to calculate the TB size based on the frequency resource corresponding to the selected TCI state.

As another example, as described above, a scheme using some of the bits for defining the DMRS pod indication field may also be used, but the field in the DCI may not be limited to the corresponding field. Accordingly, the above-described method 1-2 may be applied based on a specific field in the DCI as well as the DMRS port indication field. As an example, a specific field in the DCI may be an existing DCI field(s) or a new field defined for the above-described proposed scheme.

As another example, in order to select a frequency resource for calculating the TB size, the size (e.g., the number of PRBs, etc.) of the frequency resource mapped to the same TCI state may be used as a reference. As an example, the UE may calculate the TB size by selecting a frequency resource based on the number of PRBs. The UE may calculate the TB size based on the frequency resource corresponding to the TCI state to which fewer or more PRBs are mapped (or allocated).

As another example, in order to select the frequency resource for calculating the TB size, the size (e.g., the number of PRBs, etc.) of the frequency resource mapped to the same TCI state may be used as a reference. As an example, the UE may calculate the TB size based on the frequency resource corresponding to the TCI state mapped (or allocated) to the lowest or highest index.

In addition, a rule for a modulation and coding scheme (MCS) value to be used for calculating the TB size may need to be predefined between the base station and the UE. In this case, the corresponding MCS value may mean a specific value among a plurality of MCS values indicated to the UE through the DCI. The base station may indicate, to the UE, the MCS values for the first TB and/or the second TB through the field in the DCI, respectively. Therefore, when multiple MCS values are indicated to the UE, a rule for determining the MCS values to be applied to the calculation of the TB size may be required. In this case, the rule for determining the MCS value may follow at least one of the following examples.

Hereinafter, the following examples are only divided for convenience of description, and one or more examples may be combined and applied.

For example, when the value of information (e.g., higher layer parameter maxNrofCodeWordsScheduledByDCI) indicating the number of maximum codewords (CWs) that can be scheduled through the DCI is set to 1, the UE may be configured to calculate the TB size based on the MCS value indicated through the MCS field corresponding to the first TB.

As another example, there may be a case where the value of information (e.g., higher layer parameter maxNrofCodeWordsScheduledByDCI) indicating the maximum number of codewords schedulable through the DCI is set to 2, and the value of the MCS/RV field corresponding to the first TB and the second TB is indicated as a specific value, so that the corresponding TB (e.g., the first TB or the second TB) is indicated as disabled. In this case, the UE may be configured to calculate the TB size based on the MCS value indicated through the MCS field corresponding to the TB (e.g., the first TB or the second TB) indicated as available. As an example, the specific value may be an MCS value indicated as 26 and an RV value indicated as 1.

As another example, there may be a case in which the value of information (e.g., higher layer parameter maxN-rofCodeWordsScheduledByDCI) indicating the maximum number of codewords that can be scheduled through the DCI is set to 2, and both the first TB and the second TB are indicated to be available. In this case, an MCS value to be applied to the calculation of the TB size may be determined based on the TCI state corresponding to the frequency resource selected for calculating the TB size. As an example, it is assumed that the first TCI state (i.e., the first TCI state) corresponds to the first TB, and the second TCI state (i.e., the second TCI state) corresponds to the second TB. In this case, when the frequency resource selected for calculating the TB size corresponds to the first TCI state, the UE may calculate the TB size based on the MCS value indicated through the MCS field corresponding to the first TB. Similarly, when the frequency resource selected for calculating the TB size corresponds to the second TCI state, the UE may calculate the TB size based on the MCS value indicated through the MCS field corresponding to the second TB. In this example, it is assumed that the first TCI state corresponds to the first TB and the second TCI state corresponds to the second TB, but the correspondence between the TCI state and the TB may not be fixed to the example, and vice versa. For example, the corresponding relationship between the TCI state and the TB may be defined as a specific relationship according to a fixed rule between the base station and the UE, or may be set and/or indicated to the UE through signaling between the base station and the UE.

As another example, there may be a case in which the value of information (e.g., higher layer parameter maxN-rofCodeWordsScheduledByDCI) indicating the maximum number of codewords that can be scheduled through the DCI is set to 2, and both the first TB and the second TB are indicated to be available. In this case, the MCS value to be applied to the calculation of the TB size may be determined based on the MCS value indicated through the MCS field corresponding to each TB. As an example, the UE may calculate the TB size based on a low or high MCS value. Also, a frequency resource to be applied to the calculation of the TB size may be determined according to the TB corresponding to the MCS field applied to the calculation of the TB size. As an example, it is assumed that the first TB corresponds to the first TCI state (e.g., the first TCI state), and the second TB corresponds to the second TCI state (e.g., the second TCI state). In this case, when the MCS field selected for calculating the TB size corresponds to the first TB, the UE may calculate the TB size based on the frequency resource corresponding to the first TCI state. Similarly, when the MCS field selected for calculating the TB size corresponds to the second TB, the UE may calculate the TB size based on the frequency resource corresponding to the second TCI state. In this example, it is assumed that the first TB corresponds to the first TCI state and the second TB corresponds to the second TCI state, but the correspondence between the TB and the TCI state is not fixed to the example, and vice versa. For example, the corresponding relationship between the TB and TCI states may be defined as a specific relationship according to a fixed rule between the base station and the UE, or may be set and/or indicated to the UE through signaling between the base station and the UE.

As another example, there may be a case in which the value of information (e.g., higher layer parameter maxN-rofCodeWordsScheduledByDCI) indicating the maximum number of codewords that can be scheduled through the DCI is set to 2, and both the first TB and the second TB are indicated to be available. In this case, the UE may be configured to calculate the TB size based on the MCS value indicated through the MCS field corresponding to the specific TB. Here, the specific TB may be determined by a predefined rule between the base station and the UE, or may be configured or indicated to the corresponding UE through signaling between the base station and the UE. As an example, a certain rule may be defined so that the UE calculates the TB size based on the MCS value (e.g., the default MCS value) indicated through the MCS field corresponding to the first TB.

Second Embodiment

In the present embodiment, in relation to the above-described FRA scheme 2, a method for defining another frequency resource based on a frequency resource configured and/or indicated through a single DCI and mapping to TCI states related to different TRPs is proposed.

In the present embodiment, the methods are described by being divided into method 2-1 and method 2-2, but this is only for convenience of description, and the schemes described in method 2-1 and method 2-2 are substituted or combined with each other and may be applied. As an example, the method 2-2 may be a method for calculating a TB size related to the method 2-1.

Method 2-1)

A method in which a frequency resource allocated to a UE through a frequency resource allocation field in DCI is mapped to a TCI state related to a specific TRP and a frequency resource to which a TCI state related to another TRP is mapped based on a corresponding frequency resource is configured and/or defined may be considered. In this regard, information on a difference value from a reference frequency resource may be transmitted by signaling between the base station and the UE (e.g., higher layer signaling, DCI, etc.), or may follow a predefined rule between the base station and the UE.

To operate according to the above-described scheme, the base station may configure or indicate a specific scheme (or mode) to the UE by signaling (e.g., higher layer signaling and/or DCI, etc.) and/or a predefined rule. For example, when the UE succeeds in CRC check using a specific RNTI, the UE may be configured to interpret the DCI for frequency resource allocation according to at least one of the above-described examples.

As an example of the predefined rule in the above scheme, a rule may be defined that sets resources of the same size to be concatenated and used for transmission (e.g., PDSCH transmission) based on a resource of a frequency domain indicated to the UE through the DCI.

FIG. 15 illustrates another example of the mapping between the frequency resource to which the method proposed in the present disclosure may be applied and the TRP-related TCI state. FIG. 15 is merely for convenience of description and does not limit the scope of the present disclosure.

Referring to FIG. 15, for the Type 0 scheme and/or the Type 2 scheme, the frequency resource for the first TCI state is indicated by the DCI. In this case, the frequency resource for the second TCI state may be determined or scheduled according to a specific signaling and/or predefined rule based on the frequency resource for the first TCI state. As an example of specific signaling, the use of some fields in the existing DCI may be applied by being changed to a purpose for indicating a difference value between frequency resources (e.g., a frequency resource for a first TCI state and a frequency resource for a second TCI state). For example, the some fields may include some bit(s) of a field for indicating DMRS port and/or some bit(s) of a field (e.g., MCS/RV/NDI field, etc.) for indicating second TB information.

In addition, when considering the reference FR definition scheme 2 with respect to the above-described proposed scheme, a frequency resource indicated through the DCI coincides with a frequency resource used for transmission of a PDSCH through a specific TRP. Accordingly, some rules for the operation of the UE in consideration of this are newly defined, and the rules may be applied to the calculation scheme of the TB size. As an example, when both a TB information field (e.g., first MCS/first RV/first NDI-related field, etc.) for a first TB in the DCI and a TB information field for a second TB (e.g., second MCS/second RV/second NDI-related field, or the like) are used, the UE may calculate the TB size based on a value of a specific field. Based on the TB information field for the first TB, the UE may calculate the TB size based on the frequency resource scheduled through the DCI, and vice versa.

In addition, as described above, when only the frequency resource to which a specific TCI state is mapped is used for the calculation of the TB size, the PDSCH transmitted through the frequency resource applied to the calculation of the TB size is named the first PDSCH, and a PDSCH transmitted through another resource may be interpreted as a repeatedly transmitted PDSCH, which may be called a second PDSCH. In this case, the RV and/or modulation order of the first PDSCH and the second PDSCH may be different from each other. The UE may be configured to differently perform interpretation of some (e.g., MSB(s), LSB(s)) of the bits used in the field for DMRS port indication through optimization of the DMRS table and/or TB information for indicating the MCS/RV/NDI of the second TB, or the like.

In addition, when considering the reference FR definition scheme 1, a new scheme for calculating the TB size needs to be considered. Hereinafter, in Method 2-2, a method for calculating the TB size when the reference FR definition scheme 1 is supported with respect to the FRA scheme 2 is proposed.

Method 2-2)

When the UE calculates the TB size, the UE may calculate the TB size based on N times the frequency resource scheduled through the DCI. Here, N may be equal to the number of TCI states indicated to the UE.

The UE may recognize the number of TRPs for transmitting the PDSCH according to the scheme of 2-1 described above, which may be the same as the number of TCI states indicated to the UE. Accordingly, the UE may recognize (or determine) the size of the entire frequency resource used (or allocated) for PDSCH transmission. For example, when the size of the frequency resource scheduled through the DCI is referred to as 'B', the size of the entire frequency resource may be (B×the number of TCI states). Accordingly, the UE may be configured or defined to calculate the TB size based on (B×the number of TCI states), which is the size of the entire frequency resource used for DPSCH transmission. When the above-described scheme is applied, the TB size may be calculated based on a multiple of a frequency resource scheduled through the DCI, not a frequency resource scheduled through the DCI.

Although the above-described embodiments and methods have been described based on the case of two different TRPs, it is also possible to extend and apply the above-described scheme(s) to a plurality of TRPs (e.g., three or more TRPs). In addition, the above-described proposed scheme(s) may be extended and applied to M-TRP transmission/reception based on multiple DCI transmitting DCI in the remaining TRPs except for some TRPs among a plurality of TRPs as well as single DCI-based M-TRP transmission/reception.

In addition, in application of the above-described proposed scheme(s), QCL-related contents may be applied in consideration of the unit of a specific RB set. As an example, when a large-scale characteristic of a channel over a symbol of one antenna port transmitted within the same QCL-f-RB set may be inferred from a channel through which a symbol on another antenna port is transmitted, (in relation to specific RB aggregation), the two antenna ports may be referred to as being QCL. Here, the large-scale characteristics may include one or more of delay spread, Doppler spread, Doppler shift, average gain, average delay, and/or spatial reception parameters. In addition, the above-described QCL-f-RB set may refer to an RB set to which the same QXL reference RS (and/or antenna port) may be assumed or applied for a target antenna port. The number of consecutive RBs in the RB set may be greater than or equal to the PRG size. The method(s) proposed in the present disclosure may be an example of a method for configuring the QCL-f-RB set, and a frequency resource to which a specific TCI state is mapped may be referred to as a QCL-f-RB set.

In addition, in the methods proposed in the present disclosure, a frequency resource to which a TCI state related to a different TRP is mapped may be configured or defined to be applied in a specific unit of a virtual resource block (VRB) or a physical resource block (PRB). Alternatively, it may be configured or defined to select a specific unit (e.g., VRB or PRB) to which the above-described methods are applied through specific signaling (e.g., higher layer signaling, DCI, etc.) and/or a predefined rule.

In addition, although the methods proposed in the present disclosure have been described based on a plurality of TRPs, it goes without saying that the methods may be extended and applied to transmission and reception through a plurality of panels.

FIGS. 16 and 17 illustrate examples of signaling between a network side and a UE in a multi-TRP-based transmission/reception situation to which the method proposed in the present disclosure may be applied. FIGS. 16 and 17 are only for convenience of description, and do not limit the scope of the present disclosure. Here, the network side and the UE are merely examples, and may be replaced with various devices described with reference to FIGS. 20 to 26. In addition, some step(s) described in FIGS. 16 and 17 may be omitted depending on network conditions and/or configurations.

Referring to FIGS. 16 and 17, signaling between two TRPs and a UE is considered for convenience of description, but the signaling scheme may be extended and applied to signaling between a plurality of TRPs and a plurality of UEs. In the following description, the network side may be a single base station including a plurality of TRPs, and may be a single cell including a plurality of TRPs. As an example, an ideal/non-ideal backhaul may be configured between a first TRP (TRP 1) and a second TRP (TRP 2) constituting the network side. In addition, the following description will be described based on a plurality of TRPs, which may be equally extended and applied to transmission through a plurality of panels. In addition, in the present disclosure, the operation of the UE to receive a signal from the first TRP/second TRP may be interpreted/described (or may be an operation) as an operation of the UE to receive a signal from the network side (via/using the first TRP/second TRP), and the operation of the UE to transmit a signal to the first TRP/second TRP may be interpreted/described as an operation of the UE to transmit a signal to the network side (via/using the first TRP/second TRP), and the opposite may also be interpreted/described.

Specifically, FIG. 16 illustrates an example of signaling when the UE receives the multiple DCI in the M-TRP (or cell, hereinafter, all TRPs may be replaced with cell/panel, or M-TRP may be assumed even when a plurality of CORESETs are set from one TRP) situation (that is, when the network side transmits the DCI to the UE through/using each TRP).

The UE may receive configuration information related to multi-TRP-based transmission/reception through/using the first TRP (and/or the second TRP) from the network side (S1605). As described in the above-described method (e.g., the first embodiment, the second embodiment, etc.), the configuration information may include information related to the network-side configuration (i.e., TRP configuration)/resource information (resource allocation) related to transmission/reception based on multiple TRPs, and the like. For example, the configuration information may include CORESET and/or CORESET group (or CORESET pool) and related information. In this case, the configuration information may be transmitted through higher layer signaling (e.g., RRC signaling, MAC-CE, etc.). In addition, when the configuration information is predefined or configured, the corresponding step may be omitted. For example, the configuration information may include configurations related to the scheme described in the above-described method (e.g., the first embodiment, the second embodiment, etc.).

For example, the operation of the UE (e.g., 1010/1020 of FIGS. 20 to 26) to receive configuration information related to the multi-TRP-based transmission and reception from the network side (e.g., 1010/1020 of FIGS. 20 to 26) in step S1605 described above may be implemented by the device of FIGS. 20 to 26 to be described below. For example, referring to FIG. 21, one or more processors 102 may control one or more transceivers 106 and/or one or more memories 104 or the like to receive the configuration information, and one or more transceivers 106 may receive the configuration information from the network side.

The UE may receive the first DCI (DCI 1) and the first data (Data 1) scheduled by the first DCI through/using the first TRP from the network side (S1610-1). In addition, the UE may receive the second DCI (DCI 2) and the second data (Data 2) scheduled by the second DCI through/using the second TRP from the network side (S1610-2). For example, each TRP may configure frequency resource allocation information and the like based on the above-described method (e.g., the first embodiment, the second embodiment, etc.) in the DCI and/or data encoding process.

As a specific example, on the premise that non-overlap frequency resources are used, each DCI may include information on a mapping relationship between frequency resources and TCI states related to different TRPs (e.g., first TRP, second TRP) (e.g., 12 to 15, etc.). Through this, the UE can determine the mapping relationship between the frequency resource and the TCI state and/or TRP. In addition, for each DCI, the UE may be configured to calculate the TB size (i.e., interpret the TB-related information field) based on the frequency resource according to a certain criterion (e.g., Method 1-2 and/or Method 2-2, etc.)

Also, the DCI (e.g., first DCI and second DCI) and data (e.g., first data and second data) may be transmitted through a control channel (e.g., PDCCH, etc.) and data channel (e.g., PDSCH, etc.), respectively. In addition, steps S1610-1 and S1610-2 may be performed simultaneously or one may be performed earlier than the other.

For example, the operation of the UE (e.g., 1010/1020 of FIGS. 20 to 26) to receive the first DCI and/or the second DCI, the second DCI, or the first data and/or the second data from the network side (e.g., 1010/1020 of FIGS. 20 to 26) in steps S1610-1 and S1610-2 described above may be implemented by the device of FIGS. 20 to 26 to be described below. For example, referring to FIG. 21, one or more processors 102 may control one or more transceivers 106 and/or one or more memories 104 or the like to receive the first DCI and/or the second DCI, and the first data and/or the second data, and one or more transceivers 106 may receive the first DCI and/or the second DCI, and the first data and/or the second data from the network side.

The UE may decode the first data and/or the second data received from the network side through/using the first TRP and/or the second TRP (S1615). For example, the UE may perform the decoding differently according to the frequency resource through which each data (e.g., PDSCH) is transmitted based on the above-described method (e.g., the first embodiment, the second embodiment, etc.).

For example, the operation of the UE (e.g., 1010/1020 of FIGS. 20 to 26) to decode the first data and the second data in step S1615 described above may be implemented by the device of FIGS. 20 to 26 to be described below. For example, referring to FIG. 21, one or more processors 102 may control to decode the first data and the second data.

The UE may transmit HARQ-ACK information (e.g., ACK information, NACK information, etc.) for the first data and/or the second data to the network side through/using the first TRP and/or the second TRP (S1620-1, S1620-2). In this case, the HARQ-ACK information for the first data and the second data may be combined into one. In addition, the UE is configured to transmit only the HARQ-ACK information to the representative TRP (e.g., first TRP), and the transmission of the HARQ-ACK information to another TRP (e.g., second TRP) may be omitted.

For example, the operation of the UE (e.g., 1010/1020 of FIGS. 20 to 26) to transmit the HARQ-ACK information to the network side (e.g., 1010/1020 of FIGS. 20 to 26) in steps S1620-1 and S1620-2 described above may be implemented by the device of FIGS. 20 to 26 to be described below. For example, referring to FIG. 21, one or more processors 102 may control one or more transceivers 106 and/or one or more memories 104 or the like to transmit the HARQ-ACK information, and one or more transceivers 106 may transmit the HARQ-ACK information to the network side.

Specifically, FIG. 17 illustrates an example of signaling when the UE receives the single DCI in the M-TRP (or cell, hereinafter, all TRPs may be replaced with cell/panel, or M-TRP may be assumed even when a plurality of CORESETs are set from one TRP) situation (that is, when the network side transmits the DCI to the UE through/using each TRP). In FIG. 17, it is assumed that the first TRP is a representative TRP for transmitting the DCI.

The UE may receive configuration information related to multi-TRP-based transmission/reception through/using the first TRP (and/or the second TRP) from the network side (S1705). As described in the above-described method (e.g., the first embodiment, the second embodiment, etc.), the configuration information may include information related to the network-side configuration (i.e., TRP configuration)/resource information (resource allocation) related to transmission/reception based on multiple TRPs, and the like. For example, the configuration information may include CORESET and/or CORESET group (or CORESET pool) and related information. In this case, the configuration information may be transmitted through higher layer signaling (e.g., RRC signaling, MAC-CE, etc.). In addition, when the configuration information is predefined or configured, the corresponding step may be omitted. For example, the configuration information may include configurations related to the scheme described in the above-described method (e.g., the first embodiment, the second embodiment, etc.).

For example, the operation of the UE (e.g., 1010/1020 of FIGS. 20 to 26) to receive configuration information related to the multi-TRP-based transmission and reception from the network side (e.g., 1010/1020 of FIGS. 20 to 26) in step S1705 described above may be implemented by the device of FIGS. 20 to 26 to be described below. For example, referring to FIG. 21, one or more processors 102 may control one or more transceivers 106 and/or one or more memories 104 or the like to receive the configuration information, and one or more transceivers 106 may receive the configuration information from the network side.

The UE may receive the DCI and the first data (Data 1) scheduled by the DCI through/using the first TRP from the network side (S1710-1). In addition, the UE may receive the second data (Data 2) through/using the second TRP from the network side (S1710-2). For example, each TRP may configure frequency resource allocation information and the like based on the above-described method (e.g., the first embodiment, the second embodiment, etc.) in the DCI and/or data encoding process.

As a specific example, on the premise that non-overlap frequency resources are used, the DCI may include information on a mapping relationship between frequency resources and TCI states related to different TRPs (e.g., first TRP, second TRP) (e.g., 12 to 15, etc.). Through this, the UE can determine the mapping relationship between the frequency resource and the TCI state and/or TRP. In addition, for each DCI, the UE may be configured to calculate the TB size (i.e., interpret the TB-related information field) based on the frequency resource according to a certain criterion (e.g., Method 1-2 and/or Method 2-2, etc.)

Also, the DCI and data (e.g., first data and second data) may be transmitted through the control channel (e.g., PDCCH, etc.) and the data channel (e.g., PDSCH, etc.), respectively. In addition, steps S1710-1 and S1710-2 may be performed simultaneously or one may be performed earlier than the other.

For example, the operation of the UE (e.g., 1010/1020 of FIGS. 20 to 26) to receive the DCI, the first data and/or the second data from the network side (e.g., 1010/1020 of FIGS. 20 to 26) in steps S1710-1 and S1710-2 described above may be implemented by the device of FIGS. 20 to 26 to be described below. For example, referring to FIG. 21, one or more processors 102 may control one or more transceivers 106 and/or one or more memories 104 or the like to receive the DCI, the first data and/or the second data, and one or more transceivers 106 may receive the DCI, the first data and/or the second data from the network side.

The UE may decode the first data and/or the second data received from the network side through/using the first TRP and/or the second TRP (S1715). For example, the UE may perform the decoding differently according to the frequency resource through which each data (e.g., PDSCH) is transmitted based on the above-described method (e.g., the first embodiment, the second embodiment, etc.).

For example, the operation of the UE (e.g., 1010/1020 of FIGS. 20 to 26) to decode the first data and the second data in step S1715 described above may be implemented by the device of FIGS. 20 to 26 to be described below. For example, referring to FIG. 21, one or more processors 102 may control to decode the first data and the second data.

The UE may transmit HARQ-ACK information (e.g., ACK information, NACK information, etc.) for the first data and/or the second data to the network side through/using the first TRP and/or the second TRP (S1720-1, S1720-2). In this case, the HARQ-ACK information for the first data and the second data may be combined into one. In addition, the UE is configured to transmit only the HARQ-ACK information to the representative TRP (e.g., first TRP), and the transmission of the HARQ-ACK information to another TRP (e.g., second TRP) may be omitted.

For example, the operation of the UE (e.g., 1010/1020 of FIGS. 20 to 26) to transmit the HARQ-ACK information to the network side (e.g., 1010/1020 of FIGS. 20 to 26) in steps S1720-1 and S1720-2 described above may be implemented by the device of FIGS. 20 to 26 to be described below. For example, referring to FIG. 21, one or more processors 102 may control one or more transceivers 106 and/or one or more memories 104 or the like to transmit the HARQ-ACK information, and one or more transceivers 106 may transmit the HARQ-ACK information to the network side.

FIG. 18 illustrates an example of an operation flowchart of a UE to receive a physical downlink shared channel (PDSCH) in a wireless communication system to which the method proposed in the present disclosure may be applied. FIG. 18 is merely for convenience of description and does not limit the scope of the present disclosure.

The UE may receive configuration information related to the PDSCH (S1805). For example, the configuration information may include information related to resource allocation of a data channel, TCI status information related to a data channel, information related to M-TRP transmission, and the like. For example, the configuration information may be transmitted through higher layer signaling (e.g., RRC signaling).

For example, the operation of the UE (e.g., 1010/1020 of FIGS. 20 to 26) to receive the configuration information in step S1805 described above may be implemented by the device of FIGS. 20 to 26 to be described below. For example, referring to FIG. 21, one or more processors 102 may control one or more transceivers 106 and/or one or more memories 104 or the like to receive the configuration information, and one or more transceivers 106 may receive the configuration information.

The UE may receive downlink control information (DCI) for scheduling the PDSCH (S1810). In this case, the DCI may include TCI-related information (e.g., a TCI status field, etc.) in relation to M-TRP transmission for the PDSCH. For example, the DCI may include first TCI-related information (e.g., the above-described first TCI state) and second TCI-related information (e.g., the above-described second TCI state).

For example, the operation of the UE (e.g., 1010/1020 of FIGS. 20 to 26) to receive the DCI in step S1810 described above may be implemented by the device of FIGS. 20 to 26 to be described below. For example, referring to FIG. 21, one or more processors 102 may control one or more transceivers 106 and/or one or more memories 104 or the like to receive the DCI, and one or more transceivers 106 may receive the DCI.

The UE may receive the first PDSCH and the second PDSCH based on the configuration information and the DCI (S1815). In this case, based on a predefined rule (or signaling), a first frequency resource region for the first PDSCH may be configured according to the first TCI-related information, and a second frequency resource region for the second PDSCH may be configured according to the second TCI-related information. In addition, as described above (e.g., Method 1-2 and/or Method 2-2), the transport block size related to the reception of the first PDSCH and the reception of the second PDSCH may be determined based on the first frequency resource region.

For example, the first TCI-related information may be information to which a first index among the TCI-related information configured for the UE is mapped. In addition, the corresponding UE may receive configuration information on the first TCI-related information and the second TCI-related information through higher layer signaling. Here, the first TCI-related information may be associated with a first transmission unit (e.g., the first TRP) for transmitting the first PDSCH, and the second TCI-related information may be associated with a second transmission unit for transmitting the second PDSCH (e.g., the second TRP described above).

For example, based on the precoding information configured to a wideband precoding resource, the first frequency resource region may be configured to a first half of an entire frequency resource region allocated to the UE, and the second frequency resource region may be configured to a remaining half of the entire frequency resource region. In addition, based on the precoding information configured to one of (i) a precoding resource group configured to size 2 or (ii) a precoding resource group configured to size 4, the first frequency resource region and the second frequency resource region may be configured to cross each other in units of precoding resource groups. For example, within the entire frequency resource region allocated to the UE, the first frequency resource region may be configured in even-numbered precoding resource groups, and the second frequency resource region may be configured in odd-numbered precoding resource groups.

FIG. 19 illustrates an example of an operation flowchart of a UE to receive a physical downlink shared channel (PDSCH) in a wireless communication system to which the method proposed in the present disclosure may be applied. FIG. 19 is merely for convenience of description and does not limit the scope of the present disclosure.

The base station may transmit configuration information related to the PDSCH (S1905). For example, the configuration information may include information related to resource allocation of a data channel, TCI status information related to a data channel, information related to M-TRP transmission, and the like. For example, the configuration information may be transmitted through higher layer signaling (eg, RRC signaling).

For example, the operation of the base station (e.g., 1010/1020 of FIGS. 20 to 26) to transmit the configuration information in step S1905 described above may be implemented by the device of FIGS. 20 to 26 to be described below. For example, referring to FIG. 21, one or more processors 102 may control one or more transceivers 106 and/or one or more memories 104 or the like to transmit the configuration information, and one or more transceivers 106 may transmit the configuration information.

The base station may transmit the downlink control information (DCI) for scheduling the PDSCH (S1910). In this case, the DCI may include TCI-related information (e.g., a TCI status field, etc.) in relation to M-TRP transmission for the PDSCH. For example, the DCI may include first TCI-related information (e.g., the above-described first TCI state) and second TCI-related information (e.g., the above-described second TCI state).

For example, the operation of the base station (e.g., 1010/1020 of FIGS. 20 to 26) to transmit the DCI in step S1910 described above may be implemented by the device of FIGS. 20 to 26 to be described below. For example, referring to FIG. 21, one or more processors 102 may control one or more transceivers 106 and/or one or more memories 104 or the like to transmit the DCI, and one or more transceivers 106 may transmit the DCI.

The base station may transmit the first PDSCH and the second PDSCH based on the configuration information and the DCI (S1915). In this case, based on a predefined rule (or signaling), a first frequency resource region for the first PDSCH may be configured according to the first TCI-related information, and a second frequency resource region for the second PDSCH may be configured according to the second TCI-related information. In addition, as described above (e.g., Method 1-2 and/or Method 2-2), the transport block size related to the reception of the first PDSCH and the reception of the second PDSCH may be determined based on the first frequency resource region.

For example, the first TCI-related information may be information to which a first index among the TCI-related information configured for the UE is mapped. In addition, the corresponding base station may transmit the configuration information on the first TCI-related information and the second TCI-related information through higher layer signaling. Here, the first TCI-related information may be associated with a first transmission unit (e.g., the first TRP) for transmitting the first PDSCH, and the second TCI-related information may be associated with a second transmission unit for transmitting the second PDSCH (e.g., the second TRP described above).

For example, based on the precoding information configured to a wideband precoding resource, the first frequency resource region may be configured to a first half of an entire frequency resource region allocated to the UE, and the second frequency resource region may be configured to a remaining half of the entire frequency resource region. In addition, based on the precoding information configured to one of (i) a precoding resource group configured to size 2 or (ii) a precoding resource group configured to size 4, the first frequency resource region and the second frequency resource region may be configured to cross each other in units of precoding resource groups. For example, within the entire frequency resource region allocated to the UE, the first frequency resource region may be configured in even-numbered precoding resource groups, and the second frequency resource region may be configured in odd-numbered precoding resource groups.

As described above, the above-described signaling and operation (e.g., FIGS. 16 to 19, etc.) between the base station and/or the UE may be implemented by the device (e.g., FIGS. 20 to 26) to be described below. For example, the base station may correspond to the first wireless device, the UE may correspond to the second wireless device, and the opposite may also be considered in some cases.

For example, the above-described signaling and operation between the base station and/or the UE (e.g., FIGS. 16 to 19, etc.) may be processed by one or more processors (e.g., 102 and 202) of FIGS. 20 to 26, and the above-described signaling and operation between the base station and the UE (e.g., FIGS. 16 to 19, etc.) may be stored in the memory (e.g., one or more memories (e.g., 104 and 204) of FIG. 21) in the form of instructions/programs (e.g., instruction, executable code) for driving at least one processor (e.g., 102 and 202) of FIGS. 20 to 26.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 20 illustrates a communication system applied to the disclosure (2000).

Referring to FIG. 20, a communication system applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1010*a*, vehicles 1010*b*-1 and 1010*b*-2, an eXtended Reality (XR) device 1010*c*, a handheld device 1010*d*, a home appliance 1010*e*, an Internet of Things (IoT) device 1010*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 1010*a* to 1010*f* may be connected to the network 300 via the BSs 1020. An AI technology may be applied to the wireless devices 1010*a* to 1010*f* and the wireless devices 1010*a* to 1010*f* may be connected to the AI server 400 via the network 300. The network 300 may be configured using a 3G network, a 4G (e.g., LTE) network, or a 5G (e.g., NR) network. Although the wireless devices 1010*a* to 1010*f* may communicate with each other through the BSs 1020/network 300, the wireless devices 1010*a* to 1010*f* may perform direct communication (e.g., sidelink communication) with each other without passing through the BSs/network. For example, the vehicles 1010*b*-1 and 1010*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1010*a* to 1010*f*.

Wireless communication/connections 150*a*, 150*b*, or 150*c* may be established between the wireless devices 1010*a* to 1010*f*/BS 1020, or BS 1020/BS 1020. Herein, the wireless communication/connections may be established through various RATs (e.g., 5G NR) such as uplink/downlink communication 150*a*, sidelink communication 150*b* (or, D2D communication), or inter BS communication (e.g. Relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Devices Applicable to the Disclosure

FIG. 21 illustrates wireless devices applicable to the disclosure.

Referring to FIG. 21, a first wireless device 1010 and a second wireless device 1020 may transmit radio signals through a variety of RATs (e.g., LTE and NR). Herein, {the first wireless device 1010 and the second wireless device 1020} may correspond to {the wireless device 1010*x* and the BS 1020} and/or {the wireless device 1010*x* and the wireless device 1010*x*} of FIG. 20.

The first wireless device 1010 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 1020 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 1010 and 1020 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Disclosure is Applied

FIG. 22 illustrates a signal processing circuit for a transmit signal.

Referring to FIG. 22, a signal processing circuit 2000 may include a scrambler 2010, a modulator 2020, a layer mapper 2030, a precoder 2040, a resource mapper 2050, and a signal generator 2060. Although not limited thereto, an operation/function of FIG. 22 may be performed by the processors 102 and 202 and/or the transceivers 106 and 206 of FIG. 21. Hardware elements of FIG. 22 may be implemented in the processors 102 and 202 and/or the transceivers 106 and 206 of FIG. 21. For example, blocks 2010 to 2060 may be implemented in the processors 102 and 202 of FIG. 21. Further, blocks 1010 to 1050 may be implemented in the processors 102 and 202 of FIG. 21 and the block 1060 of FIG. 21 and the block 2060 may be implemented in the transceivers 106 and 206 of FIG. 21.

A codeword may be transformed into a radio signal via the signal processing circuit 1000 of FIG. 22. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 2010. A scramble sequence used for scrambling may be generated based on an initialization value and the initialization value may include ID information of a wireless device. The scrambled bit sequence may be modulated into a modulated symbol sequence by the modulator 2020. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 2030. Modulated symbols of each transport layer may be mapped to a corresponding antenna port(s) by the precoder 2040 (precoding). Output z of the precoder 2040 may be obtained by multiplying output y of the layer mapper 2030 by precoding matrix W of N*M. Here, N represents the number of antenna ports and M represents the number of transport layers. Here, the precoder 2040 may perform precoding after performing transform precoding (e.g., DFT transform) for complex modulated symbols. Further, the precoder 2040 may perform the precoding without performing the transform precoding.

The resource mapper 2050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 2060 may generate the radio signal from the mapped modulated symbols and the generated radio signal may be transmitted to another device through each antenna. To this end, the signal generator 2060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (2010 to 2060) of FIG. 22. For example, the wireless device (e.g., 100 or 200 of FIG. 21) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Disclosure

FIG. 23 illustrates another example of a wireless device applied to the disclosure. The wireless device may be implemented in various forms according to a use-case/service (refer to FIG. 20).

Referring to FIG. 23, wireless devices 1010 and 2010 may correspond to the wireless devices 1010 and 2010 of FIG. 21 and may be configured by various elements, components, units/portions, and/or modules. For example, each of the wireless devices 1010 and 2010 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 21. For example, the transceiver(s) 114 may include the one or more transceivers 106 and 106 and/or the one or more antennas 108 and 108 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (1010a of FIG. 20), the vehicles (1010b-1 and 1010b-2 of FIG. 20), the XR device (1010c of FIG. 20), the hand-held device (1010d of FIG. 20), the home appliance (1010e of FIG. 20), the IoT device (1010f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (1020 of FIG. 20), a network node, etc. The wireless device may be used in a mobile or fixed place according to a use-example/service.

In FIG. 23, the entirety of the various elements, components, units/portions, and/or modules in the wireless devices 1010 and 1020 may be connected to each other through a wired interface or at least a part thereof may be wirelessly connected through the communication unit 110. For example, in each of the wireless devices 1010 and 1020, the control unit 120 and the communication unit 110 may be connected by wire and the control unit 120 and first units (e.g., 130 and 140) may be wirelessly connected through the communication unit 110. Each element, component, unit/portion, and/or module within the wireless devices 1010 and 1020 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, the embodiment of FIG. 23 will be described in more detail with reference to the drawings.

Portable Device Example to which Disclosure is Applied

FIG. 24 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 24, a portable device 1010 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 23, respectively.

The communication unit 110 may transmit/receive a signal (e.g., data, a control signal, etc.) to/from another wireless device and eNBs. The control unit 120 may perform various operations by controlling components of the portable device 1010. The control unit 120 may include an Application Processor (AP). The memory unit 130 may store data/parameters/programs/codes/instructions required for driving the portable device 1010. Further, the memory unit 130 may store input/output data/information, etc. The power supply unit 140a may supply power to the portable device 1010 and include a wired/wireless charging circuit, a battery, and the like. The interface unit 140b may support a connection between the portable device 1010 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Example of AI Device Applied to the Present Disclosure

FIG. 25 illustrates an example of an AI device applied to the present disclosure. The AI device may be implemented as a fixed device or mobile device, such as TV, a projector, a smartphone, PC, a notebook, a terminal for digital broadcasting, a tablet PC, a wearable device, a set-top box (STB), a radio, a washing machine, a refrigerator, a digital signage, a robot, and a vehicle.

Referring to FIG. 25, the AI device 1010 may include a communication unit 110, a control unit 120, a memory 130, a input/output unit 140a/140b, a learning processor 140c, and a sensing unit 140d. Blocks 110~130/140a~140d correspond to block 110~130/140 in FIG. 26, respectively.

The communication unit 110 may transmit and receive wired/wireless signals (e.g., sensor information, user input, learning models, control signals, etc.) to and from external devices such as another AI device (e.g., FIG. 20, 1010x, 1020 or 400) or the AI server (FIG. 20, 400) using wired/wireless communication technology. To this end, the communication unit 110 may transmit information in the memory unit 130 to an external device or transfer a signal received from the external device to the memory unit 130.

The control unit 120 may determine at least one executable operation of the AI device 1010 based on information determined or generated using a data analysis algorithm or a machine learning algorithm. In addition, the control unit 120 may control the components of the AI device 1010 to perform the determined operation. For example, the control unit 120 may request, search for, receive or utilize the data of the learning processor unit 140c or the memory unit 130, and control the components of the AI device 1010 to perform predicted operation or operation, which is determined to be desirable, of at least one executable operation. In addition, the control unit 120 may collect history information including operation of the AI device 1010 or user's feedback on the operation and store the history information in the memory unit 130 or the learning processor unit 140c or transmit the history information to the AI server (FIG. 20, 400). The collected history information may be used to update a learning model.

The memory unit 130 may store data supporting various functions of the AI device 1010. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary to operate/execute the control unit 120.

The input unit 140a may acquire various types of data from the outside of the AI device 1010. For example, the input unit 140a may acquire learning data for model learning, input data, to which the learning model will be applied, etc. The input unit 140a may include a camera, a microphone and/or a user input unit. The output unit 140b may generate video, audio or tactile output. The output unit 140b may include a display, a speaker and/or a haptic module. The sensing unit 140 may obtain at least one of internal information of the AI device 1010, the surrounding environment information of the AI device 1010 and user information using various sensors. The sensing unit 140 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 140c may train a model composed of an artificial neural network using training data. The learning processor unit 140c may perform AI processing along with the learning processor unit of the AI server (FIG. 20, 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

FIG. 26 illustrates an AI server to be applied to the present disclosure.

Referring to FIG. 26, the AI server, 400 in FIG. 20, may mean a device which is trained by an artificial neural network using a machine learning algorithm or which uses a trained artificial neural network. In this case, the AI server 400 is configured with a plurality of servers and may perform distributed processing and may be defined as a 5G network. In this case, the AI server 400 may be included as a partial configuration of the AI device, 1010 in FIG. 25, and may perform at least some of AI processing.

The AI server 400 may include a communication unit 410, a memory 430, a learning processor 440 and a processor 460. The communication unit 410 may transmit and receive data to and from an external device, such as the AI device, 1010 in FIG. 25. The memory 430 may include a model storage unit 431. The model storage unit 431 may store a model (or artificial neural network 431a) which is being trained or has been trained through the learning processor 440. The learning processor 440 may train the artificial neural network 431a using learning data. The learning model may be used in the state in which it has been mounted on the AI server 400 of the artificial neural network or may be mounted on an external device, such as the AI device, 1010 in FIG. 25, and used. The learning model may be implemented as hardware, software or a combination of hardware and software. If some of or the entire learning model is implemented as software, one or more instructions configuring the learning model may be stored in the memory 430. The processor 460 may deduce a result value of new input data using the learning model, and may generate a response or control command based on the deduced result value.

The AI server 400 and/or the AI device 1010 may be applied by being combined with the robot 1010a, the vehicles 1010b-1 and 1010b-2, the extended reality (XR) device 1010c, the hand-held device 1010d, the home appliance 1010e, the IoT (Internet of Thing) device 1010f through the network (300 in FIG. 23). The robot 1010a, vehicles 1010b-1 and 1010b-2, extended reality (XR) device 1010c, hand-held device 1010d, home appliance 1010e, and IoT (Internet of Thing) device 1010f to which the AI technology is applied may be referred to as AI devices.

Hereinafter, examples of AI devices will be described.
(The 1st AI Device Example—AI+Robot)

An AI technology is applied to the robot 1010a, and the robot 1010a may be implemented as a guidance robot, a transport robot, a cleaning robot, a wearable robot, an entertainment robot, a pet robot, an unmanned flight robot, etc. The robot 1010a may include a robot control module for controlling an operation. The robot control module may mean a software module or a chip in which a software module has been implemented using hardware. The robot 1010a may obtain state information of the robot 1010a, may detect (recognize) a surrounding environment and object, may generate map data, may determine a moving path and a running plan, may determine a response to a user interaction, or may determine an operation using sensor information obtained from various types of sensors. In this case, the robot 1010a may use sensor information obtained by at least one sensor among LIDAR, a radar, and a camera in order to determine the moving path and running plan.

The robot 1010a may perform the above operations using a learning model configured with at least one artificial neural network. For example, the robot 1010a may recognize a surrounding environment and object using a learning model, and may determine an operation using recognized surrounding environment information or object information. In this case, the learning model may have been directly trained in the robot 1010a or may have been trained in an external device, such as the AI server 400. In this case, the robot 1010a may directly generate results using the learning model and perform an operation, but may perform an operation by transmitting sensor information to an external device, such as the AI server 400, and receiving results generated in response thereto.

The robot 1010a may determine a moving path and running plan using at least one of map data, object information detected from sensor information, or object information obtained from an external device. The robot 1010a may run along the determined moving path and running plan by controlling the driving unit. The map data may include object identification information for various objects disposed in the space in which the robot 1010a moves. For example, the map data may include object identification information for fixed objects, such as a wall and a door, and movable objects, such as a flowport and a desk. Furthermore, the object identification information may include a name, a type, a distance, a location, etc.

The robot 1010a may perform an operation or run by controlling the driving unit based on a user's control/interaction. In this case, the robot 1010a may obtain intention information of an interaction according to a user's behavior or voice speaking, may determine a response based on the obtained intention information, and may perform an operation.
(The 2nd AI Device Example—AI+Self-Driving)

An AI technology is applied to the self-driving vehicle (1010b-1, 1010b-2), and the self-driving vehicle (1010b-1, 1010b-2) may be implemented as a movable type robot, a vehicle, an unmanned flight body, etc. The self-driving vehicle (1010b-1, 1010b-2) may include a self-driving control module for controlling a self-driving function. The self-driving control module may mean a software module or a chip in which a software module has been implemented using hardware. The self-driving control module may be included in the self-driving vehicle (1010b-1, 1010b-2) as an element of the self-driving vehicle 100b, but may be configured as separate hardware outside the self-driving vehicle 100b and connected to the self-driving vehicle (1010b-1, 1010b-2).

The self-driving vehicle (1010b-1, 1010b-2) may obtain state information of the self-driving vehicle (1010b-1, 1010b-2), may detect (recognize) a surrounding environment and object, may generate map data, may determine a moving path and running plan, or may determine an operation using sensor information obtained from various types of sensors. In this case, in order to determine the moving path and running plan, like the robot 1010a, the self-driving vehicle (1010b-1, 1010b-2) may use sensor information obtained from at least one sensor among LIDAR, a radar and a camera. Particularly, the self-driving vehicle (1010b-1, 1010b-2) may recognize an environment or object in an area whose view is blocked or an area of a given distance or more by receiving sensor information for the environment or object from external devices, or may directly receive recognized information for the environment or object from external devices.

The self-driving vehicle (1010b-1, 1010b-2) may perform the above operations using a learning model configured with at least one artificial neural network. For example, the self-driving vehicle (1010b-1, 1010b-2) may recognize a surrounding environment and object using a learning model, and may determine the flow of running using recognized surrounding environment information or object information. In this case, the learning model may have been directly trained in the self-driving vehicle (1010b-1, 1010b-2) or may have been trained in an external device, such as the AI server 400. In this case, the self-driving vehicle (1010b-1, 1010b-2) may directly generate results using the learning model and perform an operation, but may perform an operation by transmitting sensor information to an external device, such as the AI server 400, and receiving results generated in response thereto.

The self-driving vehicle (1010b-1, 1010b-2) may determine a moving path and running plan using at least one of map data, object information detected from sensor information or object information obtained from an external device. The self-driving vehicle (1010b-1, 1010b-2) may run based on the determined moving path and running plan by controlling the driving unit. The map data may include object identification information for various objects disposed in the space (e.g., road) in which the self-driving vehicle (1010b-1, 1010b-2) runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle (1010b-1, 1010b-2) may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

(The 3rd AI Device Example—AI+XR)

An AI technology is applied to the XR device 1030c, and the XR device 1030c may be implemented as a head-mount display, a head-up display provided in a vehicle, television, a mobile phone, a smartphone, a computer, a wearable device, home appliances, a digital signage, a vehicle, a fixed type robot or a movable type robot. The XR device 1030c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 1030c may output an XR object, including additional information for a recognized object, by making the XR object correspond to the corresponding recognized object.

The XR device 1030c may perform the above operations using a learning model configured with at least one artificial neural network. For example, the XR device 1030c may recognize a real object in three-dimensional point cloud data or image data using a learning model, and may provide information corresponding to the recognized real object. In this case, the learning model may have been directly trained in the XR device 1030c or may have been trained in an external device, such as the AI server 400. In this case, the XR device 1030c may directly generate results using a learning model and perform an operation, but may perform an operation by transmitting sensor information to an external device, such as the AI server 400, and receiving results generated in response thereto.

(The 4th AI Device Example—AI+Robot+Self-Driving Vehicle)

An AI technology and a self-driving technology are applied to the robot 1010a, and the robot 1010a may be implemented as a guidance robot, a transport robot, a cleaning robot, a wearable robot, an entertainment robot, a pet robot, an unmanned flight robot, etc. The robot 1010a to which the AI technology and the self-driving technology have been applied may mean a robot itself having a self-driving function or may mean the robot 1010a interacting with the self-driving vehicle (1010b-1, 1010b-2). The robot 1010a having the self-driving function may collectively refer to devices that autonomously move along a given flow without control of a user or autonomously determine a flow and move. The robot 1010a and the self-driving vehicle (1010b-1, 1010b-2) having the self-driving function may use a common sensing method in order to determine one or more of a moving path or a running plan. For example, the robot 1010a and the self-driving vehicle (1010b-1, 1010b-2) having the self-driving function may determine one or more of a moving path or a running plan using information sensed through LIDAR, a radar, a camera, etc.

The robot 1010a interacting with the self-driving vehicle (1010b-1, 1010b-2) is present separately from the self-driving vehicle (1010b-1, 1010b-2), and may perform an operation associated with a self-driving function inside or outside the self-driving vehicle (1010b-1, 1010b-2) or related to a user got in the self-driving vehicle (1010b-1, 1010b-2). In this case, the robot 1010a interacting with the self-driving vehicle (1010b-1, 1010b-2) may control or assist the self-driving function of the self-driving vehicle (1010b-1, 1010b-2) by obtaining sensor information in place of the self-driving vehicle (1010b-1, 1010b-2) and providing the sensor information to the self-driving vehicle (1010b-1, 1010b-2), or by obtaining sensor information, generating surrounding environment information or object information, and providing the surrounding environment information or object information to the self-driving vehicle (1010b-1, 1010b-2).

The robot 1010a interacting with the self-driving vehicle (1010b-1, 1010b-2) may control the function of the self-driving vehicle (1010b-1, 1010b-2) by monitoring a user got in the self-driving vehicle (1010b-1, 1010b-2) or through an interaction with a user. For example, if a driver is determined to be a drowsiness state, the robot 1010a may activate the self-driving function of the self-driving vehicle (1010b-1, 1010b-2) or assist control of the driving unit of the self-driving vehicle (1010b-1, 1010b-2). In this case, the function of the self-driving vehicle (1010b-1, 1010b-2) controlled by the robot 1010a may include a function provided by a navigation system or audio system provided within the self-driving vehicle (1010*b*-1, 1010*b*-2), in addition to a self-driving function simply.

The robot 1010*a* interacting with the self-driving vehicle (1010*b*-1, 1010*b*-2) may provide information to the self-driving vehicle (1010*b*-1, 1010*b*-2) or may assist a function outside the self-driving vehicle (1010*b*-1, 1010*b*-2). For example, the robot 100*a* may provide the self-driving vehicle (1010*b*-1, 1010*b*-2) with traffic information, including signal information, as in a smart traffic light, and may automatically connect an electric charger to a filling inlet through an interaction with the self-driving vehicle (1010*b*-1, 1010*b*-2) as in the automatic electric charger of an electric vehicle.

(The 5th AI Device Example—AI+Robot+XR)

An AI technology and an XR technology are applied to the robot 1010*a*, and the robot 1010*a* may be implemented as a guidance robot, a transport robot, a cleaning robot, a wearable robot, an entertainment robot, a pet robot, an unmanned flight robot, a drone, etc. The robot 1010*a* to which the XR technology has been applied may mean a robot, that is, a target of control/interaction within an XR image. In this case, the robot 1010*a* is different from the XR device 1010*c*, and they may operate in conjunction with each other.

When the robot 1010*a*, that is, a target of control/interaction within an XR image, obtains sensor information from sensors including a camera, the robot 1010*a* or the XR device 1010*c* may generate an XR image based on the sensor information, and the XR device 1010*c* may output the generated XR image. Furthermore, the robot 1010*a* may operate based on a control signal received through the XR device 1010*c* or a user's interaction. For example, a user may identify a corresponding XR image at timing of the robot 1010*a*, remotely operating in conjunction through an external device, such as the XR device 1010*c*, may adjust the self-driving path of the robot 1010*a* through an interaction, may control an operation or driving, or may identify information of a surrounding object.

(The 6th AI Device Example—AI+Self-Driving Vehicle+XR)

An AI technology and an XR technology are applied to the self-driving vehicle (1010*b*-1, 1010*b*-2), and the self-driving vehicle (1010*b*-1, 1010*b*-2) may be implemented as a movable type robot, a vehicle, an unmanned flight body, etc. The self-driving vehicle (1010*b*-1, 1010*b*-2) to which the XR technology has been applied may mean a self-driving vehicle equipped with means for providing an XR image or a self-driving vehicle, that is, a target of control/interaction within an XR image. Particularly, the self-driving vehicle 100*b*, that is, a target of control/interaction within an XR image, is different from the XR device 1010*c*, and they may operate in conjunction with each other.

The self-driving vehicle (1010*b*-1, 1010*b*-2) equipped with the means for providing an XR image may obtain sensor information from sensors including a camera, and may output an XR image generated based on the obtained sensor information. For example, the self-driving vehicle (1010*b*-1, 1010*b*-2) includes an HUD, and may provide a passenger with an XR object corresponding to a real object or an object within a screen by outputting an XR image. In this case, when the XR object is output to the HUD, at least some of the XR object may be output with it overlapping a real object toward which a passenger's view is directed. In contrast, when the XR object is displayed on a display included within the self-driving vehicle (1010*b*-1, 1010*b*-2), at least some of the XR object may be output so that it overlaps an object within a screen. For example, the self-driving vehicle (1010*b*-1, 1010*b*-2) may output XR objects corresponding to objects, such as a carriageway, another vehicle, a traffic light, a signpost, a two-wheeled vehicle, a pedestrian, and a building.

When the self-driving vehicle (1010*b*-1, 1010*b*-2), that is, a target of control/interaction within an XR image, obtains sensor information from sensors including a camera, the self-driving vehicle (1010*b*-1, 1010*b*-2) or the XR device 1010*c* may generate an XR image based on the sensor information. The XR device 1010*c* may output the generated XR image. Furthermore, the self-driving vehicle (1010*b*-1, 1010*b*-2) may operate based on a control signal received through an external device, such as the XR device 1010*c*, or a user's interaction.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the method of transmitting and receiving data in the wireless communication system of the present disclosure has been described in connection with examples in which it applies to 3GPP LTE/LTE-A system and 5G systems (new RAT systems), the method is also applicable to other various wireless communication systems.

The invention claimed is:
1. A method of receiving, by a user equipment (UE), a physical downlink shared channel (PDSCH) in a wireless communication system, the method comprising:
   receiving configuration information related to the PDSCH;
   receiving a downlink control information (DCI) message for scheduling the PDSCH, the DCI message including information related to a first transmission configuration indication (TCI)-related information and a second TCI-related information; and
   receiving a first PDSCH and a second PDSCH based on the configuration information and the DCI message,
   wherein based on a predefined rule, a first frequency resource for the first PDSCH is configured based on the first TCI-related information, and a second frequency resource for the second PDSCH is configured based on the second TCI-related information, wherein the first frequency resource is different from the second frequency resource, and
   wherein a transport block size related to the first PDSCH and the second PDSCH is determined based on the first frequency resource.

2. The method of claim 1, wherein the first TCI-related information is information to which a first index is mapped among pieces of TCI-related information configured for the UE.

3. The method of claim 1, further comprising:
   receiving configuration information for the first TCI-related information and the second TCI-related information through higher layer signaling,
   wherein the first TCI-related information is associated with a first transmission unit for transmitting the first PDSCH, and the second TCI-related information is associated with a second transmission unit for transmitting the second PDSCH.

4. The method of claim 1, wherein based on the predefined rule determined as precoding information configured to a wideband precoding resource, the first frequency resource is configured as a first half of an entire frequency resource allocated to the UE, and the second frequency resource is configured as a remaining half of the entire frequency resource.

5. The method of claim 1, wherein, based on the predefined rule determined as precoding information configured to one of (i) a precoding resource group configured to size 2 or (ii) a precoding resource group configured to size 4, the first frequency resource and the second frequency resource are configured to cross each other in units of precoding resource groups.

6. The method of claim 5, wherein, within the entire frequency resource allocated to the UE, the first frequency resource is configured in even-numbered precoding resource groups, and the second frequency resource is configured in odd-numbered precoding resource groups.

7. A user equipment (UE) configured to receive a physical downlink shared channel (PDSCH) in a wireless communication system, the UE comprising:
   at least one transceiver;
   at least one processor; and
   at least one computer memory operably connectable to the at least one processor and storing instructions that, based on being executed by the at least one processor, perform operations comprising:
   receiving a downlink control information (DCI) message for scheduling the PDSCH, the DCI message including information related to a first transmission configuration indication (TCI)-related information and a second TCI-related information, and
   receiving a first PDSCH and a second PDSCH based on the configuration information and the DCI message,
   wherein based on a predefined rule, a first frequency resource for the first PDSCH is configured based on the first TCI-related information, and a second frequency resource for the second PDSCH is configured based on the second TCI-related information, wherein the first frequency resource is different from the second frequency resource, and
   wherein a transport block size related to the first PDSCH and the second PDSCH is determined based on the first frequency resource.

8. The UE of claim 7, wherein the first TCI-related information is information to which a first index is mapped among pieces of TCI-related information configured for the UE.

9. The UE of claim 7, wherein the operations further include receiving configuration information for the first TCI-related information and the second TCI-related information through higher layer signaling, and
   the first TCI-related information is associated with a first transmission unit for transmitting the first PDSCH, and the second TCI-related information is associated with a second transmission unit for transmitting the second PDSCH.

10. The UE of claim 7, wherein, based on the predefined rule determined as precoding information configured to a wideband precoding resource, the first frequency resource is configured as a first half of an entire frequency resource allocated to the UE, and the second frequency resource is configured as a remaining half of the entire frequency resource.

11. The UE of claim 7, wherein, based on the predefined rule determined as precoding information configured to one of (i) a precoding resource group configured to size 2 or (ii) a precoding resource group configured to size 4, the first frequency resource and the second frequency resource are configured to cross each other in units of precoding resource groups.

12. The UE of claim 11, wherein, within the entire frequency resource allocated to the UE, the first frequency resource is configured in even-numbered precoding resource groups, and the second frequency resource is configured in odd-numbered precoding resource groups.

13. A base station (BS) configured to transmit a physical downlink shared channel (PDSCH) in a wireless communication system, the BS comprising:
   at least one transceiver;
   at least one processor; and
   at least one computer memory operably connectable to the at least one processor and storing instructions that, based on being executed by the at least one processor, perform operations comprising:
   transmitting configuration information related to the PDSCH;
   transmitting a downlink control information (DCI) message for scheduling the PDSCH, the DCI message including information related to a first transmission configuration indication (TCI)-related information and a second TCI-related information, and
   transmitting a first PDSCH and a second PDSCH based on the configuration information and the DCI message, wherein based on a predefined rule, a first frequency resource for the first PDSCH is configured based on the first TCI-related information, and a second frequency resource for the second PDSCH is configured based on the second TCI-related information, wherein the first frequency resource is different from the second frequency resource, and wherein a transport block size related to the first PDSCH and the second PDSCH is determined based on the first frequency resource.

* * * * *